(12) United States Patent
Chao et al.

(10) Patent No.: US 10,368,205 B2
(45) Date of Patent: Jul. 30, 2019

(54) PROVIDING, ORGANIZING, AND MANAGING LOCATION HISTORY RECORDS OF A MOBILE DEVICE

(71) Applicant: QUALCOMM Incorporated, San Diego, CA (US)

(72) Inventors: Hui Chao, San Jose, CA (US); Saumitra Mohan Das, San Jose, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/274,196

(22) Filed: Feb. 12, 2019

(65) Prior Publication Data

US 2019/0174267 A1   Jun. 6, 2019

Related U.S. Application Data

(63) Continuation of application No. 16/028,402, filed on Jul. 5, 2018, which is a continuation of application
(Continued)

(51) Int. Cl.
*H04W 24/00* (2009.01)
*H04W 4/029* (2018.01)
(Continued)

(52) U.S. Cl.
CPC ............ *H04W 4/029* (2018.02); *G01S 5/02* (2013.01); *G06Q 10/06* (2013.01);
(Continued)

(58) Field of Classification Search
CPC .................................................... H04W 4/029
(Continued)

(56) References Cited

U.S. PATENT DOCUMENTS 10,045,159 B2   8/2018   Chao et al.
2004/0030832 A1   2/2004   Squibbs
(Continued)

OTHER PUBLICATIONS

International Preliminary Report on Patentability—PCT/US2016/037157, The International Bureau of WIPO—Geneva, Switzerland, dated Jan. 11, 2018.
(Continued)

*Primary Examiner* — Chuck Huynh
(74) *Attorney, Agent, or Firm* — Bala Ramasamy; Muncy, Geissler, Olds & Lowe, P.C.

(57) ABSTRACT

Methods and systems for providing information associated with a location history of a mobile device to one or more applications are disclosed. A mobile device generates one or more location history records based on one or more locations of the mobile device, each location history record comprising one or more points of interest and a duration at the one or more points of interest, receives an information request from at least one application, determines a subset of the one or more location history records that meet criteria from the information request, determines a level of permission for the at least one application based on the information request and the subset of the one or more location history records, and provides information associated with the subset of the one or more location history records to the at least one application based on the level of permission.

30 Claims, 11 Drawing Sheets

Related U.S. Application Data

No. 14/791,067, filed on Jul. 2, 2015, now Pat. No. 10,045,159.

(51) Int. Cl.
*G01S 5/02* (2010.01)
*G06Q 30/02* (2012.01)
*G06Q 10/06* (2012.01)
*H04W 4/021* (2018.01)

(52) U.S. Cl.
CPC ..... *G06Q 30/0254* (2013.01); *G06Q 30/0261* (2013.01); *G06Q 30/0271* (2013.01); *H04W 4/021* (2013.01)

(58) Field of Classification Search
USPC ............................... 455/456.2, 456.1, 404.2
See application file for complete search history.

(56) References Cited

U.S. PATENT DOCUMENTS

| | | | |
|---|---|---|---|
| 2010/0041378 A1 | 2/2010 | Aceves et al. | |
| 2010/0251340 A1* | 9/2010 | Martin | G06F 9/541 726/4 |
| 2012/0100869 A1 | 4/2012 | Liang et al. | |
| 2013/0244686 A1 | 9/2013 | Saha et al. | |
| 2014/0106785 A1 | 4/2014 | Hawkins et al. | |
| 2014/0128105 A1* | 5/2014 | Su | H04W 4/021 455/456.3 |
| 2015/0169597 A1 | 6/2015 | Edge et al. | |
| 2017/0006430 A1 | 1/2017 | Chao et al. | |
| 2018/0317053 A1 | 11/2018 | Chao et al. | |

OTHER PUBLICATIONS

International Search Report and Written Opinion—PCT/US2016/037157—ISA/EPO—dated Jul. 26, 2016.

Kupper A., et al., "Part II Positioning" In: "Location-based Services: Fundamentals and Operation", Dec. 6, 2005 (Dec. 6, 2005), John Wiley & Sons, Inc., XP055288600, pp. 123-245, DOI: 10.1002/0470092335, p. 128 figures 6.1,6.2 section 6. 1. 3 tables 6.1,6.4.

Kupper A: "LBS Middleware" In: "Location-Based Services", Dec. 6, 2005 (Dec. 6, 2005), John Wiley & Sons, Ltd, Chichester, UK, XP055288603, ISBN: 978-0-470-09231-6 pp. 315-336, DOI: 10.1002/0470092335, figure 12.1 section 12.1 p. 316-p. 317.

Stuedi P., et al., "WhereStore: location-based data storage for mobile devices interacting with the cloud," Proceedings of the 1st ACM Workshop on Mobile Cloud Computing & Services: Social Networks and Beyond, 2010, 8 pages.

* cited by examiner

| | Time | Position | Provided by | | Duration | Latest Request | Req Freq | Sensor Info | Position ID |
|---|---|---|---|---|---|---|---|---|---|
| | | | cell | other | | | | | |
| 502Z | 14 May 14 3:00pm | 38.8314N, 77.2958W | X | X | 0h40m | | | | Sports Authority |
| | ... | ... | ... | ... | ... | ... | ... | ... | ... |
| 502O | 14 Jul 14 0:00am | 38.8047N, 77.0472W | X | X | 7h0m | | | | home |
| 502N | 14 Jul 14 7:00am | 38.8203N, 77.9961W | | X | 0h35m | | | | commute |
| 502M | 14 Jul 14 7:35am | 38.8358N, 77.1582W | X | | 0h35m | | | | 7-Eleven |
| 502L | 14 Jul 14 7:40am | 38.8493N, 77.2015W | X | | 0h15m | | | | <unknown> |
| 502K | 14 Jul 14 7:55am | 38.8505N, 77.3094W | | X | 0h5m | | | | commute |
| 502J | 14 Jul 14 8:00am | 38.8526N, 77.3944W | X | | 4h0m | | | | Chez Patricia |
| 502I | 14 Jul 14 12:00pm | 38.8241N, 77.1760W | X | | 0h30m | | | | Safeway |
| 502H | 14 Jul 14 12:30pm | 38.8526N, 77.3944W | X | | 4h30m | | | | Chez Patricia |
| 502G | 14 Jul 14 5:00pm | 38.8403N, 77.3688W | | X | 0h30m | 14 Apr 14 3:00pm | 23 | 75 bpm | Washington Park |
| 502F | 14 Jul 14 5:30pm | 38.8377N, 77.3157W | X | X | 0h10m | | | | Whole Foods |
| 502E | 14 Jul 14 5:40pm | 38.8241N, 77.1760W | X | | 0h20m | | | | Safeway |
| 502D | 14 Jul 14 6:00pm | 38.8241N, 77.1760W | X | X | 0h20m | 14 Jul 14 6:10pm | | | Safeway |
| 502C | 14 Jul 14 6:20pm | 38.8173N, 77.1176W | X | X | 0h20m | | | | Chez LaVerne |
| 502B | 14 Jul 14 7:00pm | 38.8124N, 77.0805W | | X | 0h40m | | | | commute |
| 502A | 14 Jul 14 7:40pm | 38.8047N, 77.0472W | X | X | 4h20m | | | | home |

FIG. 5

PROVIDING, ORGANIZING, AND MANAGING LOCATION HISTORY RECORDS OF A MOBILE DEVICE

CROSS-REFERENCE TO RELATED APPLICATIONS

The present Application for Patent is a continuation of U.S. application Ser. No. 16/028,402, entitled "PROVIDING, ORGANIZING, AND MANAGING LOCATION HISTORY RECORDS OF A MOBILE DEVICE," filed Jul. 5, 2018, which is a continuation of U.S. application Ser. No. 14/791,067, entitled "PROVIDING, ORGANIZING, AND MANAGING LOCATION HISTORY RECORDS OF A MOBILE DEVICE," filed Jul. 2, 2015, now U.S. Pat. No. 10,045,159 issued on Aug. 7, 2018, each assigned to the assignee hereof, and expressly incorporated herein by reference in its entirety.

BACKGROUND

1. Field of the Disclosure

Aspects disclosed herein generally relate to providing, organizing, and managing a location history record of a mobile device.

2. Description of Related Art

Some mobile devices (e.g., smartphones, tablet computers, and the like) include operating systems. The operating system is configured to execute application software installed on the mobile device. Application software products (i.e., applications) specifically designed to be executed using the operating system of a mobile device can be referred to as mobile "apps."

Development of such applications originally focused on functions demanded by users of mobile devices to take advantage of the portability of the mobile devices. These applications can provide functionality for the mobile devices to support electronic mail (e-mail), calendars, personal contact information, news information, stock market information, and the like. Continued demand has led to the development of applications for mobile devices in categories such as games, factory automation (e.g., updates to existing mobile apps), banking, order-tracking, ticket purchases, managing health-related issues, and the like.

Some mobile apps can interact with a sensor of the mobile device. For example, a radio frequency point of sale transaction sensor can be used by a mobile app to complete a transaction at a store. For example, a heart rate sensor can be used by a mobile app to monitor and to report a heart rate of a user of the mobile device.

The ability to determine the location of mobile devices with a high degree of precision has led to the development of location-based services, a category of mobile apps that use location data to control features. The value of such mobile apps can be based upon: (1) knowledge of a degree of proximity between the mobile device (and, by extension, a user of the mobile device) and a point of interest associated with an application (either the mobile app providing the location-based service or another mobile app) and (2) inferences that can be made from such knowledge. Examples of location-based services can include, but are not limited to, products that identify locations of a particular category of goods and/or services, weather information, social networking applications (e.g., tracking a location of an individual), parcel tracking, turn-by-turn navigation, environmental alerts (e.g., high concentration of a particular allergen in the air), services for sending requests for emergency assistance, and the like.

In particular, applications developed for mobile devices by retailers and/or other third parties have implemented location-based services related to identifying locations of specific providers of goods and/or services, location-based advertising, location-based promotions, and the like. In being executed, such a mobile app can send a request for a location of the mobile device to determine a response based upon the location. In being executed, such a mobile app can also send the location of the mobile device to a server under the control of the entity that developed the mobile app.

SUMMARY

The following presents a simplified summary relating to one or more aspects and/or embodiments associated with the mechanisms disclosed herein for providing, organizing, and managing a location history record of a mobile device. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of providing information associated with a location history of a mobile device to one or more applications includes generating, by a processor of the mobile device, one or more location history records based on one or more locations of the mobile device, wherein each location history record comprises one or more points of interest and a duration of the mobile device at the one or more points of interest, receiving, at the processor of the mobile device, an information request from at least one application of the one or more applications, determining, by the processor of the mobile device, a subset of the one or more location history records that meet criteria from the information request, determining, by the processor of the mobile device, a level of permission for the at least one application based on the information request and the subset of the one or more location history records, and providing, by the processor of the mobile device, information associated with the subset of the one or more location history records to the at least one application based on the level of permission of the at least one application.

An apparatus for providing information associated with a location history of a mobile device to one or more applications includes at least one processor configured to generate one or more location history records based on one or more locations of the mobile device, wherein each location history record comprises one or more points of interest and a duration of the mobile device at the one or more points of interest, to receive an information request from at least one application of the one or more applications, to determine a subset of the one or more location history records that meet criteria from the information request, to determine a level of permission for the at least one application based on the information request and the subset of the one or more location history records, and to provide information associated with the subset of the one or more location history records to the at least one application based on the level of permission of the at least one application, and a memory coupled to the at least one processor and configured to store the one or more location history records and information associated with the one or more location history records.

An apparatus for providing information associated with a location history of a mobile device to one or more applications includes means for generating one or more location history records based on one or more locations of the mobile device, wherein each location history record comprises one or more points of interest and a duration of the mobile device at the one or more points of interest, means for receiving an information request from at least one application of the one or more applications, means for determining a subset of the one or more location history records that meet criteria from the information request, means for determining a level of permission for the at least one application based on the information request and the subset of the one or more location history records, and means for providing information associated with the subset of the one or more location history records to the at least one application based on the level of permission of the at least one application.

A non-transitory computer-readable medium for providing information associated with a location history of a mobile device to one or more applications includes at least one instruction to generate, by a processor of the mobile device, one or more location history records based on one or more locations of the mobile device, wherein each location history record comprises one or more points of interest and a duration of the mobile device at the one or more points of interest, at least one instruction to receive, at the processor of the mobile device, an information request from at least one application of the one or more applications, at least one instruction to determine, by the processor of the mobile device, a subset of the one or more location history records that meet criteria from the information request, at least one instruction to determine, by the processor of the mobile device, a level of permission for the at least one application based on the information request and the subset of the one or more location history records, and at least one instruction to provide, by the processor of the mobile device, information associated with the subset of the one or more location history records to the at least one application based on the level of permission of the at least one application.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 5 is a diagram illustrating an example relational table stored in the memory of the mobile device according to at least one aspect of the disclosure.

DETAILED DESCRIPTION

Figure 1:
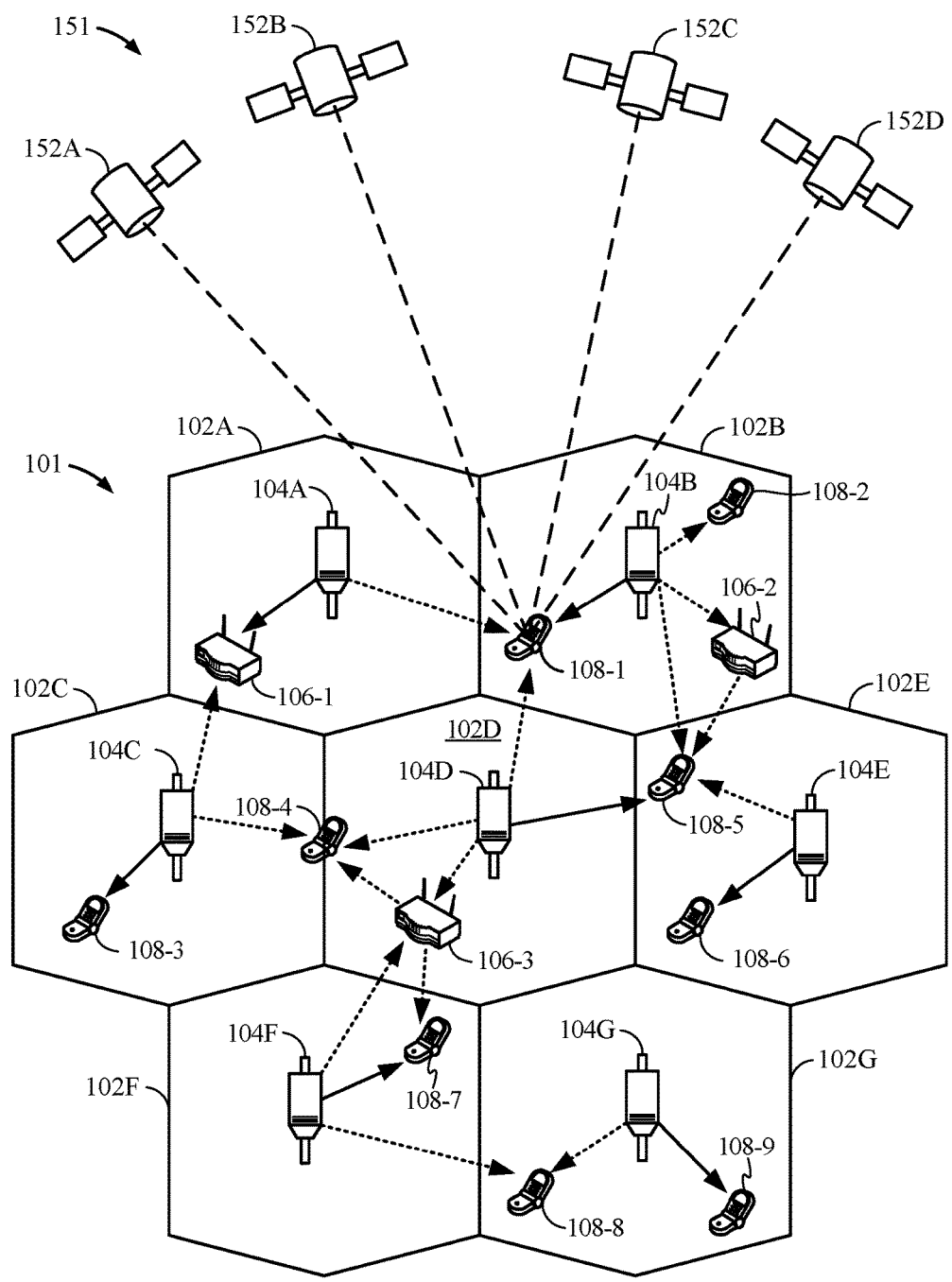
FIG. 1 is a diagram illustrating an example of an environment in which a mobile device can operate.

Methods and systems for providing information associated with a location history of a mobile device to one or more applications are disclosed. The mobile device generates one or more location history records based on one or more locations of the mobile device, wherein each location history record comprises one or more points of interest and a duration of the mobile device at the one or more points of interest, receives an information request from at least one application of the one or more applications, determines a subset of the one or more location history records that meet criteria from the information request, determines a level of permission for the at least one application based on the information request and the subset of the one or more location history records, and provides information associated with the subset of the one or more location history records to the at least one application based on the level of permission of the at least one application.

These and other aspects are disclosed in the following description and related drawings to show specific examples relating to exemplary embodiments of providing, organizing, and managing a location history record of a mobile device. Alternative aspects may be devised without departing from the scope of this disclosure. Additionally, well-known elements are not described in detail or are omitted so as not to obscure the relevant details of the disclosure.

The word "exemplary" is used herein to mean "serving as an example, instance, or illustration." Any aspect described herein as "exemplary" is not necessarily to be construed as preferred or advantageous over other alternatives. Likewise, the term "aspect" does not require that all aspects of the disclosure include the discussed feature, advantage, or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It is further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It is recognized that various actions described herein can be performed by specific circuits (e.g., application-specific integrated circuits (ASICs)), by program instructions being executed by one or more processors, or by a combination of both. Additionally, these sequence of actions described herein can be considered to be realized entirely within any form of computer readable storage medium having stored therein a corresponding set of computer instructions that upon execution cause an associated processor to perform the functionality described herein. Thus, the various aspects of the disclosure may be realized in a number of different forms, all of which have been contemplated to be within the scope of the claimed subject matter. In addition, for each of the aspects described herein, the corresponding form of any such aspects may be described herein as, for example, "circuitry configured to" perform the described action.

FIG. 1 is a diagram illustrating an example of an environment in which a mobile device can operate. The environment may include a cellular network 101. Optionally, the environment may also include a satellite navigation system 151.

By way of example, and not by way of limitation, the cellular network 101 can include multiple cells 102 (e.g., cells 102A-102G). An access point 104 (e.g., access points 104A-104G) can provide communication services for a corresponding cell 102. By way of example, and not by way of limitation, FIG. 1 illustrates several local access points 106 (e.g., 106-1-106-3) and several mobile devices 108 (e.g., 108-1-108-9). A mobile device 108 can also be referred to as a a user equipment (UE), a station, a terminal, an access terminal, a subscriber unit, etc. A local access point 106 can also be referred to as a node, an access point, a wireless access point, etc. A local access point 106 may be, for example, a small cell cellular base station, a wireless local area network (WLAN) access point, a Bluetooth® access point, an RFID reader, etc. A mobile device 108 can be, for example, a cellular phone, a personal digital assistant (PDA), a wireless modem, a wireless communication device, a handheld device, a laptop computer, a cordless phone, a wireless local loop (WLL) station, a netbook, a smartbook, a smartphone, a tablet computer, wearable computer, automobile, etc. Further, although referred to as a "mobile device," one or more of mobile devices 108 may be a stationary device, such as a personal computer. A local access point 106 and/or a mobile device 108 can be configured to communicate with each other and/or one or more access points 104 via a forward link and/or a reverse link. For example, cells 102 can be configured to provide communications within an area of a few blocks in an urban setting or several square miles in a rural environment. The cellular network 101 can be configured to determine a location of a mobile device 108, with a rough degree of precision, based upon, for example, the strength of a signal between the mobile device 108 and an access point 104.

The satellite navigation system 151 can be used to determine a location of a mobile device 108 with a greater degree of precision. For example, the satellite navigation system 151 can be the Global Positioning System. The Global Positioning System includes satellites 152 distributed above the Earth in manner so that any point on the Earth has a line of sight to at least six satellites 152. Each satellite 152 includes a high precision clock. The Global Positioning System is configured so that, at a given time, both a position of a satellite 152 (e.g., 152A-152D) and the given time are known with high degrees of precision. Each satellite 152 of the Global Positioning System transmits a signal that includes information indicative of both a time of transmission of the signal and a position of the satellite 152. The mobile device 108 can be configured to receive the signal from each of at least four satellites 152 (e.g., 152A-152D), to record a time of arrival for each signal according to a clock of the mobile device 108, to determine a time of flight for each signal, and to derive from the times of flight both the location of the mobile device 108 and a deviation of the clock of the mobile device 108 from the clocks of the satellites 152.

One of skill in the art understands other techniques that can be used to determine the location of the mobile device 108 with a degree of precision that can be greater than the degree of precision obtained from the cellular network 101.

For example, the mobile device 108 can be configured to use WLAN technology and can be further configured to determine the location of the mobile device 108 from a WLAN network. Moreover, the mobile device 108 can be configured to determine the location of the mobile device 108 from a 2.4 GHz WLAN network and can be configured to determine the location of the mobile device 108 from a 5 GHz WLAN network. For example, some types of mobile devices 108 can be configured to use WLAN technology rather than the cellular network 101.

As another example, the mobile device 108 can be configured to operate according to a Bluetooth® technology standard and can be further configured to determine the location of the mobile device 108 from a Bluetooth® network.

As yet another example, the mobile device 108 can be configured to determine the location of the mobile device 108 from a combination of any of a cellular network 101, a satellite navigation system 151, a WLAN network (e.g., 2.4 GHz and/or 5 GHz), a Bluetooth® network, or the like.

Figure 2:
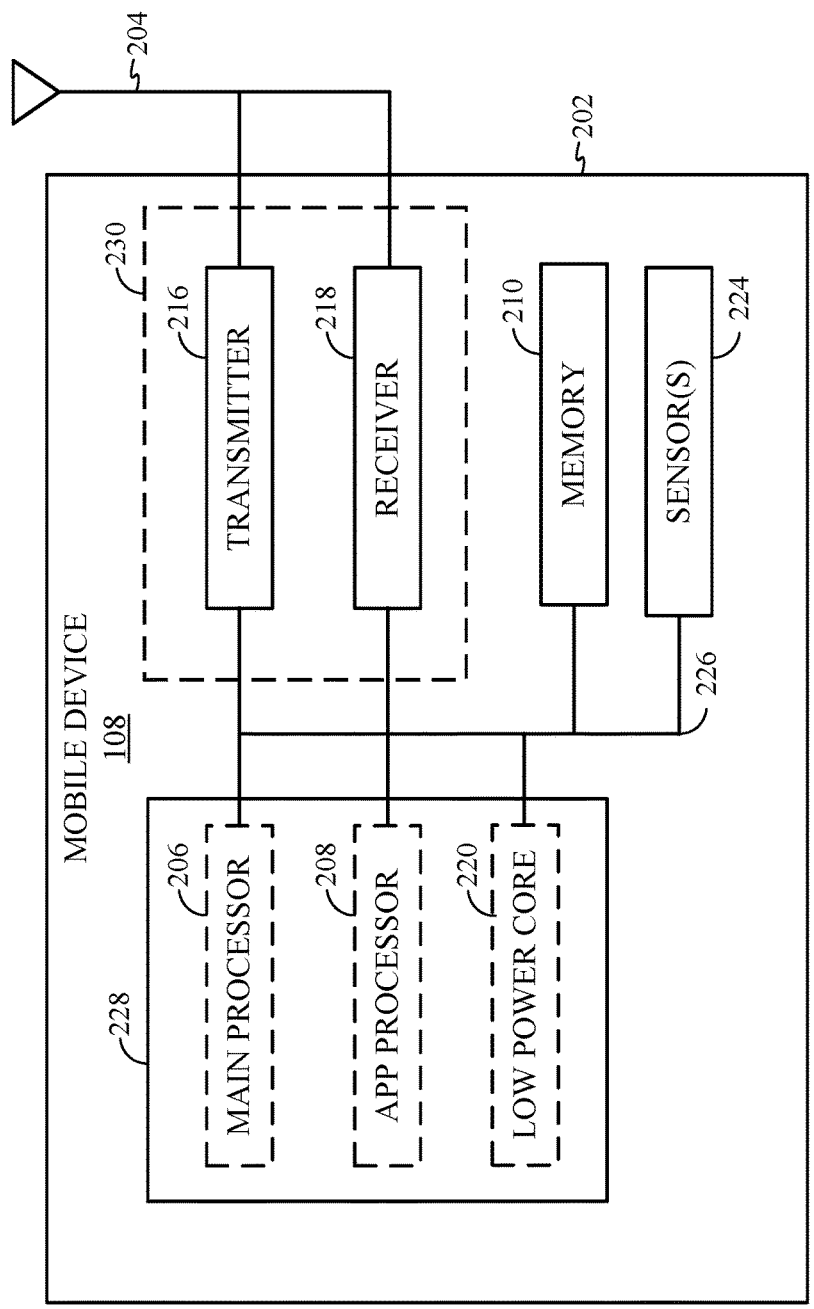
FIG. 2 is a block diagram illustrating an embodiment of the mobile device according to an embodiment of the disclosure.

FIG. 2 is a block diagram illustrating an embodiment of the mobile device 108 according to at least one aspect of the disclosure. The mobile device 108 can include a housing 202, one or more antennas 204, a processor 228, which may include a main processor 206, an application processor 208, and/or a low power core 220, a memory 210, a transmitter 216, a receiver 218, one or more sensors 224, and a bus system 226. The functions of the transmitter 216 and the receiver 218 can be incorporated into a transceiver 230. The low power core 220 may be, for example, a modem, a digital signal processor (DSP), a low-power processor (i.e., a processor consuming less power than the application processor 208 or the main processor 206), or other specialized circuitry. Although illustrated as components of the processor 228, the main processor 206, the application processor 208, and/or the low power core 220 may be separate components. For example, the processor 228 may only include the main processor 206, the low power core 220 may be a discrete modem component, and the application processor 208 may be a separate processor from both the processor 228 and the low power core 220.

The processor 228 can be configured to control operations of the mobile device 108. In an embodiment, the processor 228 may be the central processing unit (CPU) of the mobile device 108. In another embodiment, the application processor 208 may be the CPU and/or the graphics processing unit (GPU) of the mobile device 108. The memory 210 can be coupled to the processor 228, can be in communication with the processor 228, and can provide instructions and data to the processor 228. The processor 228 can perform logical and arithmetic operations based on program instructions stored within the memory 210. The instructions in the memory 210 can be executable to perform one or more of the methods and processes described herein.

The processor 228 can include, or be a component of, a processing system implemented with one or more processors (e.g., the main processor 206, the application processor 208, and the low power core 220). The processors 206, 208, and 220 can be implemented with any combination of general-purpose microprocessors, microcontrollers, DSPs, field programmable gate array (FPGAs), programmable logic devices (PLDs), controllers, state machines, gated logic, discrete hardware components, dedicated hardware finite state machines, or any other suitable entities that can perform calculations and/or manipulate information.

The processing system can also include machine-readable media for storing software. Software can be construed broadly to mean any type of instructions, whether referred to as software, firmware, middleware, microcode, hardware description language, or otherwise. Instructions can include code, e.g., in source code format, binary code format, executable code format, or any other suitable format of code. The instructions, when executed by the one or more processors, can cause the processing system to perform one or more of the functions described herein.

The memory 210 can include both read-only memory (ROM) and random access memory (RAM). A portion of the memory 210 can also include non-volatile random access memory (NVRAM).

In an embodiment, the mobile device 108 may include a user interface, such as a keypad, a microphone, a speaker, a display screen, and/or a touchscreen display. The user interface can include any element or component that conveys information to a user of the mobile device 108 and/or receives input from a user. However, the user interface may be on a different device, such as an external display, another computing device, etc.

The transmitter 216 and the receiver 218 (or the transceiver 230) can allow transmission and reception of data between the mobile device 108 and a remote device. The one or more antennas 204 can be attached to the housing 202 and be electrically coupled to the transceiver 230. In some implementations, the mobile device 108 can also include multiple transmitters, multiple receivers, multiple transceivers, and/or multiple antennas (not illustrated).

The one or more sensors 224 can be any device that can take a measurement of a physical property and can convert the measurement into a signal. The one or more sensors 224 can include, but are not limited to, a camera, a microphone, a touchscreen display, a thermal sensor, a magnetic sensor, an electric field sensor, an optical sensor, a motion sensor, an accelerometer, an inertial measurement unit, a pressure sensor, a touch screen sensor, a six degree of freedom sensor, a portrait/landscape sensor, an olfactory sensor, a heart rate sensor, a chemical environmental sensor, a biosensor, a metabolic indication sensor, a radio frequency point of sale transaction sensor, the like, or any combination of the foregoing. Additionally or alternatively, at least one of the one or more sensors 224 can be separate from the mobile device 108 (i.e., external from the housing 202).

In addition to determining its position based on signals from the satellites 152 of the Global Positioning System and/or the cellular network 101, the mobile device 108 may utilize on-board inertial sensors (e.g., accelerometers, gyroscopes, etc.) of the one or more sensors 224 to measure an inertial state of the mobile device 108. Inertial measurements obtained from these on-board inertial sensors may be used in combination with or independent of navigation signals received from satellites 152 and/or the cellular network 101 to provide estimates of the geographic position and heading of the mobile device 108.

The various components of the mobile device 108 can be coupled together by a bus system 226. The bus system 226 can include a data bus, and can also include a power bus, a control signal bus, and/or a status signal bus in addition to the data bus.

As will be appreciated, the mobile device 108 can include other components or elements not illustrated in FIG. 2.

Additionally, although a number of separate components are illustrated in FIG. 2, one or more of the components can be combined or commonly implemented. For example, the processor 228 and the memory 210 can be embodied on a single chip. The processor 228 can additionally and/or alternatively contain memory, such as processor registers. Similarly, one or more of the functional blocks or portions of the functionality of various blocks can be embodied on a single chip. Alternatively, the functionality of a particular block can be implemented on two or more chips.

Some mobile devices 108 (e.g., smartphones, tablet computers, and the like) can include operating systems. The operating system can be configured to execute application software installed on the mobile device 108. Applications specifically designed to be executed using the operating system of a mobile device 108 can also be referred to as mobile "apps."

Development of such applications originally focused on functions demanded by users of mobile devices 108 to take advantage of the portability of the mobile devices 108. These applications can provide functionality for the mobile devices 108 to support electronic mail (e-mail), calendars, personal contact information, news information, stock market information, and the like. Continued demand has led to the development of applications for mobile devices 108 in categories such as games, factory automation (e.g., updates to existing mobile apps), banking, order-tracking, ticket purchases, managing health-related issues, and the like.

Some mobile apps can interact with at least one of the sensor 224. For example, a radio frequency point of sale transaction sensor can be used by a mobile app to complete a transaction at a store. For example, a heart rate sensor can be used by a mobile app to monitor and to report a heart rate of a user of the mobile device 108.

The ability to determine the location of mobile devices 108 with a high degree of precision, as described above, has led to the development of location-based services, a category of mobile apps that use location data to control features. The value of such mobile apps can be based upon: (1) knowledge of a degree of proximity between the mobile device 108 (and, by extension, a user of the mobile device 108) and a point of interest associated with an application (either the mobile app providing the location-based service or another mobile app) and (2) inferences that can be made from such knowledge. Examples of location-based services can include, but are not limited to, products that identify locations of a particular category of goods and/or services, weather information, social networking applications (e.g., tracking a location of an individual), parcel tracking, turn-by-turn navigation, environmental alerts (e.g., high concentration of a particular allergen in the air), services for sending requests for emergency assistance, and the like.

In particular, applications developed for mobile devices 108 by retailers and/or other third parties have implemented location-based services related to identifying locations of specific providers of goods and/or services, location-based advertising, location-based promotions, and the like. In being executed, such a mobile app can send a request for a location of the mobile device 108 to determine a response based upon the location. In being executed, such a mobile app can also send the location of the mobile device 108 to a server (not illustrated) under the control of the entity that developed the mobile app.

This approach has several drawbacks. For example, the value of knowing the instantaneous location of the mobile device 108 (and, by extension, a user of the mobile device 108) is limited to the relatively small number of inferences that can be made from the knowledge of only the instantaneous location of the mobile device 108. Additionally, for example, if several such mobile apps are being executed, the processor 228 may be required to make redundant determinations of the location of the mobile device 108 in response to numerous requests, from the several mobile apps, for the location of the mobile device 108. Such redundant determinations can be at the expense of other instructions that could otherwise be executed by the processor 228. Furthermore, for example, a user of the mobile device 108 may not want the entity that developed the mobile app to have knowledge of the instantaneous location of the mobile device 108 (and, by extension, a user of the mobile device 108).

However, instead of, or in addition to, the instantaneous location of the mobile device 108, to some mobile apps, the location history of the mobile device 108 may be more useful. For example, the location history of the mobile device 108 may reflect the user of the mobile device 108's preferences and long-term trends for shopping, food, exercise, etc. It may also reflect how important the user may be to a particular retailer.

However, location history information is currently not exposed in a structured manner and is only tracked by "Cloud"-based mobile apps on a per application basis. In this situation, each mobile app can only have a limited view of the location history of the mobile device 108 as seen by the application invocations of the location API.

Accordingly, at a high level, the systems and methods disclosed herein may track the location history of the mobile device 108 at low power (e.g., by the low power core 220) on a system wide basis, compute/generate additional metadata/tags based on the location history, change mobile app permissions models to deal with location history information, expose different levels of detail and granularity of the location history based on the needs of the mobile apps, and dynamically adjust the location history tracking based on app requests.

There are a number of benefits to allowing mobile apps to use location history information of the mobile device 108. For example, the location history can be used to make the application experience more customized to the user. As another example, the user of the mobile device 108 can use the location history as an asset in order to obtain, for example, better offers from third parties by selectively exposing the location history subject to privacy preferences. As yet another example, the user of the mobile device 108 can use location history information as a credential for performing operations within several mobile apps.

Accordingly, aspects described herein generate location history records of the mobile device 108. A location history record can include at least a position of the mobile device 108, the time at which the position of the mobile device 108 was captured, and optionally, the duration of the mobile device 108 at the position.

The location history record can be produced, for example, by software stored in memory 210 that can be executed by the processor 228 (specifically, in an embodiment, the low power core 220) of the mobile device 108. Such software can be configured, for example, as middleware to interface between an operating system of the mobile device 108 and one or more mobile apps.

Advantageously, having location history records produced by the mobile device 108 can reduce a need for the processor 228 to make redundant determinations of the location of the mobile device 108 in response to numerous requests, from several mobile apps, for the location of the mobile device 108, and can thereby free the processor 228 to execute other instructions. The location history records can be stored, for example, in the memory 210 of the mobile device 108. Access to the location history records can be controlled by the mobile device 108 so that a user of the mobile device 108 can determine which applications can receive at least one of the location history records.

Figure 3:
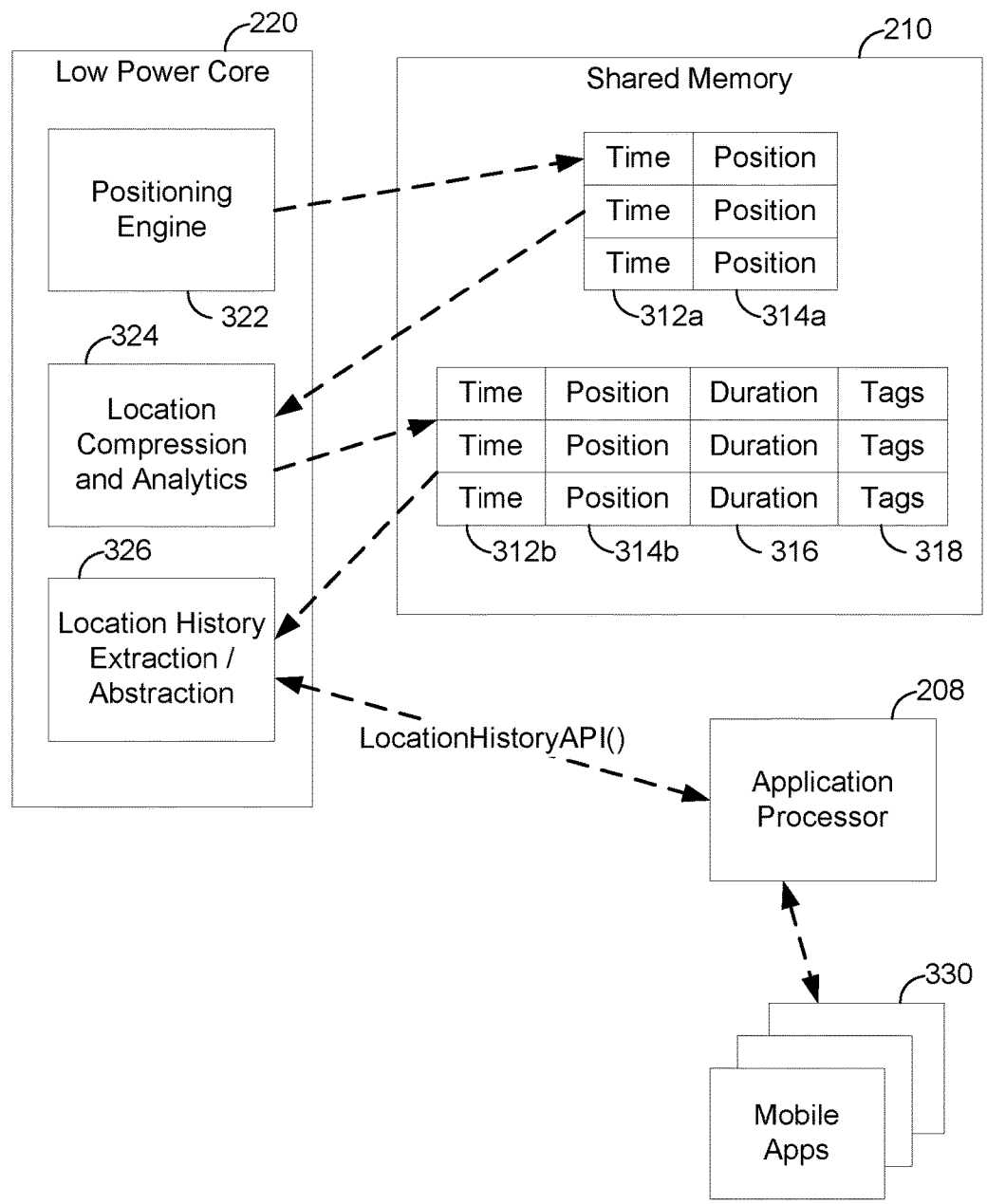
FIG. 3 illustrates an architecture of the mobile device according to at least one aspect of the disclosure.

FIG. 3 illustrates an architecture of the mobile device 108 according to at least one aspect of the disclosure. In the example of FIG. 3, the low power core 220 includes a positioning engine 322, a location compression and analytics module 324, and a location history extraction/abstraction module 326. The positioning engine 322, the location compression and analytics module 324, and the location history extraction/abstraction module 326 may be hardware components integrated in or functionally coupled to the low power core 220, software modules executed by the low power core, or a combination of hardware and software.

The positioning engine 322 tracks the position of the mobile device 108 over time using one or more of the positioning techniques described above (e.g., the cellular network 101, the satellite navigation system 151, a WLAN network, a Bluetooth® network, etc.). The outputs of the positioning engine 322 are cached in the shared memory 210 as, for example, a relational table of times in time field 312a (the time a position measurement was taken) and the corresponding positions in position field 314a (which may be latitude and longitude measurements, an access point identifier, etc.). These outputs may be gathered by the positioning engine 322 based on requests from mobile apps 330, WLAN or cellular scans done for connectivity, and/or the like.

The location compression and analytics module 324 clusters the positions in position fields 314a of the mobile device 108 and estimates the durations of the mobile device 108 in those clusters to identify discrete positions of the mobile device 108 over time. The discrete positions of the mobile device 108 are stored in position field 314b and the duration of the mobile device 108 at that discrete position is stored in duration field 316. The time that the mobile device was at that position, such as the start time, end time, median time, etc., is stored in the time field 312b. In an embodiment, the time field 312b, the position field 314b, and optionally the duration field 316 may collectively be referred to herein as a "position record" or a "location record."

The location compression and analytics module 324 can then lookup, or cause the mobile device 108 to lookup, locations corresponding to the clusters in a POI database to associate the identified locations with different metadata tags 318. The identified locations corresponding to the clustered positions in position field 314b may be associated with metadata tags from the POI database that, for example, identify the locations and/or describe one or more activities associated with the locations. For example, if a location corresponding to a cluster of positions in position field 314*b* corresponds to a Safeway™ POI in the POI database, the location may be assigned metadata tags 318 of "Safeway™," "shopping," "grocery shopping," "deli," "bakery," etc. The POI database may be stored locally (e.g., in shared memory 210) or remotely and accessible to the mobile device 108 over a wireless network.

In an embodiment, the location compression and analytics module 324 may determine that clusters along roads should be compressed a single location and assigned metadata tags 318 such as "commute." In another embodiment, the location compression and analytics module 324 may determine that short-lived clusters (e.g., clusters of positions in position field 314*b* at which the mobile device 108 spent less than a threshold amount of time) or location with no corresponding metadata tags can be deleted.

In an embodiment, data from the one or more sensors 224 can be used to augment the analysis performed by the location compression and analytics module 324 and add additional metadata tags 318 for the identified locations. For example, a cluster of positions in a position field 314*b* may be identified in the POI database as corresponding to a public park. Data from an accelerometer of the one or more sensors 224 may indicate that the user of mobile device 108 was running when the positioning engine 322 measured the positions represented in position field 314*b*. Accordingly, the location compression and analytics module 324 may assign an additional metadata tag 318 of, for example, "running" for the identified location.

In an embodiment, the metadata tags 318 may be the actual sensor data. For example, the user may have maintained an average heart rate of 75 bpm during a given duration at a given position of the mobile device 108 (as in 502G of FIG. 5). The metadata tags 318 can include other statistics, such as standard deviation, maximum(s), minimum(s), etc., as discussed below with reference to FIG. 7. In addition, the metadata tags 318 may change or be recorded based on the assigned tag. For example, if the metadata tag 318 is "running," then the mobile device 108 can record the heart rate every one second and store it as the sensor metadata.

As another example, a cluster of positions in position field 314*b* may correspond to the user of the mobile device 108 commuting to work. One of the one or more sensors 224 may detect that the mobile device 108 is playing music, or that the user is listening to music on the radio. Accordingly, the location compression and analytics module 324 may assign an additional metadata tag 318 of, for example, "listening to music" for the identified location.

As yet another example, a cluster of positions in position field 314*b* may correspond to the user of the mobile device 108 being at a particular shopping location. One of the one or more sensors 224 may detect that the mobile device 108 made a payment at the shopping location. Accordingly, the location compression and analytics module 324 may assign an additional metadata tag 318 of, for example, "purchase made" for the identified location.

In an embodiment, location history records may include the time fields 312*b*, the position fields 314*b*, the duration fields 316, and the metadata tags 318.

Because the analytics performed by the location compression and analytics module 324 may be computationally intensive, these operations can be performed when the mobile device 108 is connected to a power source, rather than in real time as the times in time fields 312*a* and the positions in position fields 314*a* are collected.

The location history extraction/abstraction module 326 receives requests for location history records and/or information associated with the location history records (e.g., a subset of the time fields 312*b*, the position fields 314*b*, the duration fields 316, and the metadata tags 318) from the mobile apps 330 via the application processor 208. Note that the requests for location history records/information associated with the location history records are separate requests from the requests to measure the positions in position fields 314*a* of the mobile device 108, which, as noted above, may also be received from the mobile apps 330. As will be described further herein, the requests for location history records/information associated with the location history records may include one or more criteria for filtering the information associated with the location history records.

Figure 4:
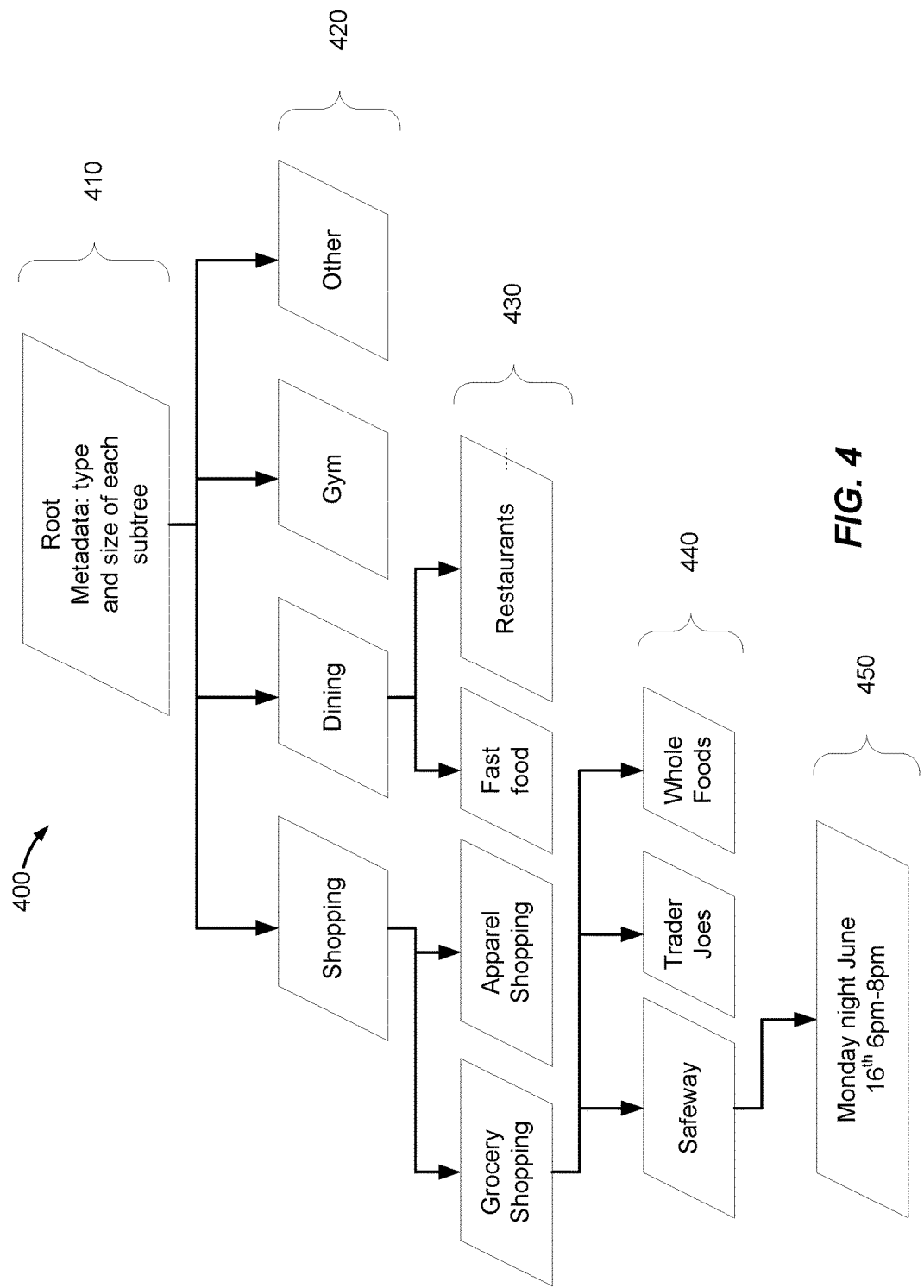
FIG. 4 illustrates an example tree structure of metadata tags associated with locations derived from the positions of the mobile device according to at least one aspect of the disclosure.

FIG. 4 illustrates an example tree structure 400 of metadata tags associated with locations derived from the positions in position fields 314*a* of the mobile device 108 according to at least one aspect of the disclosure. A root 410 of the tree structure 400 may be associated with metadata indicating the type and size of each subtree. The metadata may indicate the type(s) of the subtrees (in the example of FIG. 4, Shopping, Dining, Gym, and Other), the size(s) of the subtrees, the number of children, and/or a summary of the subtree. As will be described below, the size of a subtree may indicate the time spent at one or more locations in that category. The summary of the subtree may be a summary of information over a period of time, for example, the past two months.

As illustrated in FIG. 4, the tree structure 400 includes a first level 420 having four example categories of locations, Shopping, Dining, Gym, and Other. A second level 430 of the tree structure 400 divides the Shopping category into the sub-categories of Grocery Shopping and Apparel Shopping and the Dining category into the sub-categories of Fast Food and Restaurants. A third level 440 of the tree structure 400 divides the sub-category of Grocery Shopping into the further sub-categories of Safeway™, Trader Joes™, and Whole Foods™. A fourth level 450 of the tree structure 400 corresponds to the leaf nodes of the tree structure 400. The leaf nodes provide detailed location and timing (e.g., duration) information. As will be appreciated, although FIG. 4 only illustrates four levels, there may be more or fewer levels of the tree structure 400.

As can be seen, FIG. 4 illustrates how various locations (determined by clustering the positions in position fields 314*a* of the mobile device 108) may be assigned multiple metadata tags at increasing levels of granularity/specificity. If the user of the mobile device 108 visits a particular location more frequently than others, the subtree associated with that location may be more developed than subtrees associated with other locations. For example, the location compression and analytics module 324 may access a default number or levels of metadata tags for a particular location. As the mobile device 108 makes additional visits to the location, the mobile device 108 may access additional metadata tags associated with the location. The additional metadata tags may be more specific information about the location. For example, if the location is a Safeway™ grocery store, as illustrated in FIG. 4, the location compression and analytics module 324 may retrieve the first two levels of metadata tags of Shopping and Grocery Shopping from the POI database on the first visit. On a subsequent visit, the location compression and analytics module 324 may retrieve the third level of metadata tag of Safeway™. On yet a subsequent visit, the location compression and analytics module 324 may retrieve a fourth level of metadata tags of Deli, Bakery, and Pharmacy (not illustrated).

In this way, for nodes that are less important to the mobile apps currently requesting the information associated with the location history records, such as the metadata tags illustrated in FIG. 4, the information associated with the location history records may only include the first level of metadata tags. For example, the Gym subtree may not include additional sub-categories because the user of the mobile device 108 only spent one hour at the gym in the past two weeks. Thus, based on the activities of the user and the requests from the mobile apps, more resources may be allocated to some tree nodes than to others.

In an embodiment, where the metadata tags for a location are augmented with metadata tags based on data gathered by the one or more sensors 224, the more frequently the user visits the location, the more opportunities the location compression and analytics module 324 will have to gather data from the one or more sensors 224 and thereby to add metadata tags for the location based on that data. For example, where the location is a public park that the user of the mobile device 108 frequents, the one or more sensors may detect that at one visit the user runs through the park, at another visit the user walks through the park, at another visit the user remains near a playground in the park for a period of time, etc. Thus, the location compression and analytics module 324 may assign additional metadata tags to the public park location based on these activities.

FIG. 5 is a diagram illustrating an example relational table 500 stored in the memory 210 of the mobile device 108 according to at least one aspect of the disclosure. The relational table 500 can be configured to store location history records 502A-502Z. Location records may correspond to the position column 506 and the time column 504, and optionally to the duration column 510. The times in the time column 504, the positions in the position column 506, and the durations in the duration column 510 may correspond to the times in time fields 312b, the positions in position fields 314b, and the durations in duration fields 316, respectively, in FIG. 3. The location history records include the location records and further correspond to the provided by column 508, the latest request column 512, the request frequency column 514, the sensor information column 516, and the position identifier (ID) column 518. Although illustrated as combined with the location history records 502A-Z, the location records may be stored as and/or referred to as separate records.

Although not illustrated in FIG. 5, the relational table 500 may include additional columns, such as one or more columns corresponding to each level of the metadata tags illustrated in FIG. 4. For example, one or more of the Safeway™ location history records 502D, 502E, and 502I may include additional columns for the metadata tags of Shopping, Grocery Shopping, Deli, Bakery, and/or Pharmacy, depending on the number of visits the user of mobile device 108 has made to Safeway™.

Figure 6:
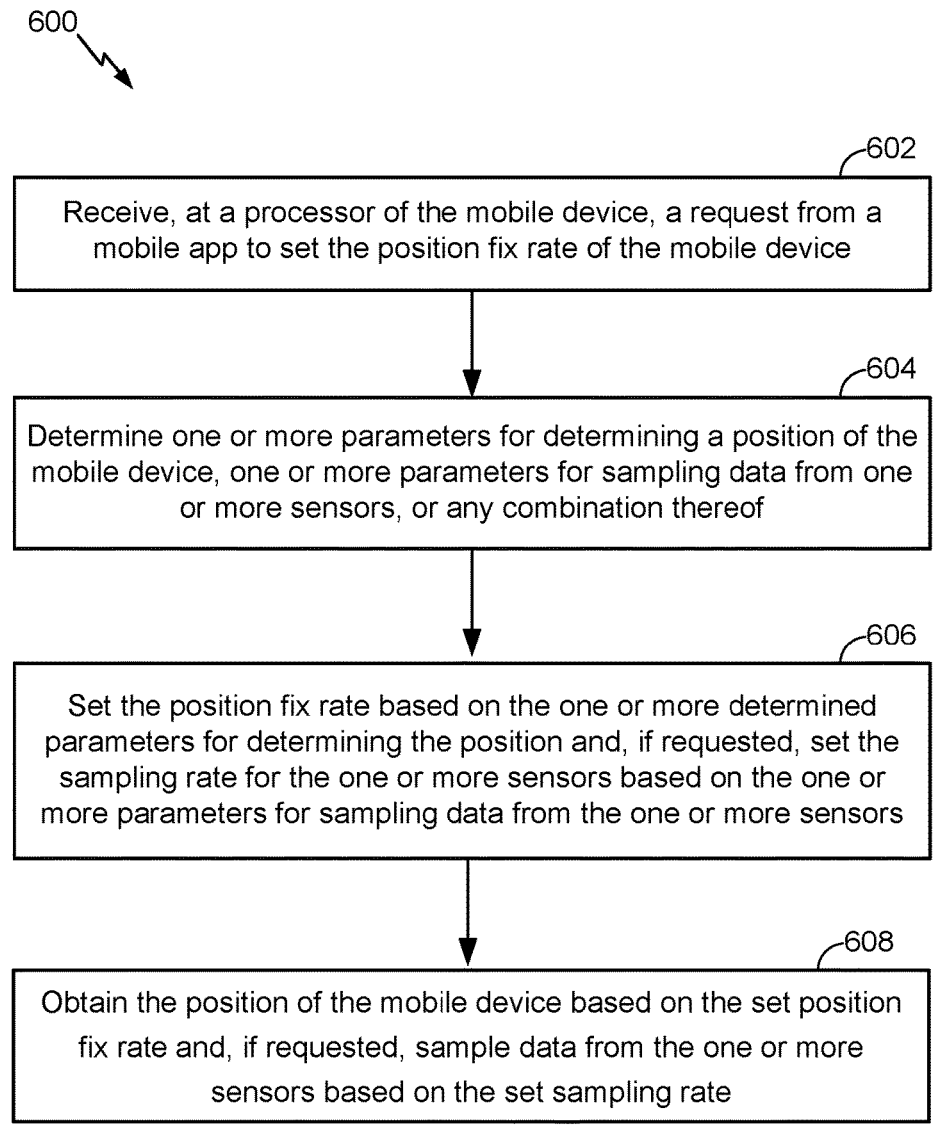
FIG. 6 is a flow diagram illustrating a method for generating position records according to at least one aspect of the disclosure.

FIG. 6 is a flow diagram illustrating a method 600 for generating position records according to at least one aspect of the disclosure. At block 602, the processor 228 receives a position fix rate request from a mobile app. In an embodiment, the request may define how frequently the mobile app would like a position of the mobile device 108 to be determined. As described below, the low power core 220 may determine the position of the mobile device 108 and the rate of determining the position of the mobile device 108 independently of the request from the mobile app. For example, the low power core 220 may determine a default rate of performing location fixes, but, based on a request from a mobile app, may update that default rate, as discussed below with reference to 604.

In an embodiment, the low power core 220 may generate a position record for each position fix (e.g., for each position in position fields 314a in FIG. 3). Alternatively, the low power core 220 may generate a position record for each position corresponding to a cluster of positions of the mobile device 108 (e.g., for each position in position fields 314b in FIG. 3). As discussed with reference to FIG. 3, a "position record" or a "location record" is a record of the position of the mobile device 108 at a given time, and may be, for example, the geographic coordinates of the position and a corresponding timestamp. Alternatively, the low power core 220 may generate position records for only certain position fixes. For example, the low power core 220 may only generate position records if the mobile device 108 has moved more than a threshold distance since the last position fix.

The requested frequency may be based on proximity of the mobile device 108 to one or more points of interest, an amount of movement of the mobile device 108, or any combination thereof. For example, the mobile device 108, specifically, the low power core 220, may generate a position record every one minute. However, a mobile app for the coffee shop Starbucks™ may request that the mobile device 108 generate a position record every one second anytime the mobile device 108 is near or at a Starbucks™ store. The Starbucks™ mobile app may send this request to the processor 228 when the application is first opened, for example. The low power core 220 may evaluate this request and adjust how frequently it determines the position of the mobile device 108 and generates a corresponding position record based on the mobile device 108's proximity to one or more points of interest. In this situation, the Starbucks™ mobile app would only need to send the request once, and the Starbucks™ mobile app could be closed but the low power core 220 would generate location fixes/position records based on the request.

In another example, the mobile device 108 may again generate a position record every one minute. However, the pedometer application may request that the mobile device 108 generate a position record every one second when the mobile device 108 is moving or was moving in the last minute.

In an embodiment, the request to generate one or more position records may include positioning technologies to use, a position uncertainty threshold, or any combination thereof.

In an embodiment, the position fix rate request may also include a sensor rate request, that is, a request to sample data from the one or more sensors 224 at a given rate. For example, a pedometer application may request that whenever the mobile device 108 has moved in the last one minute, the sweat sensor of the one or more sensors 224 should generate/sample data every second and a position record should be generated every ten seconds.

In an embodiment, the request to generate one or more position records may include a request to generate data from the one or more sensors 224 based on the proximity of the mobile device 108 to one or more points of interest, the movement of the mobile device, or any combination thereof. For example, a fitness application may request that whenever the mobile device 108 is in proximity with a gym, position records be generated every one second and data from a heart rate sensor be sampled every 30 seconds.

In another example, a mobile app for the grocery store Safeway™ may request that whenever the mobile device 108 is in proximity with the checkout line at a Safeway™ store, the radio frequency point of sale transaction sensor of the one or more sensors 224 of the mobile device 108 be enabled. This provides a user of the mobile device 108 with a valuable service by anticipating a need to use the mobile device 108 to complete a transaction at the Safeway™ store. Advantageously, maintaining the radio frequency point of sale transaction sensor in an inactive state, in the absence of a sensor rate request from a mobile app to change the sampling rate of the radio frequency point of sale transaction sensor, may free the processor 228 to execute other instructions, may limit consumption of the memory 210, can prolong a time duration during which the power source of the mobile device 108 (e.g., a battery) may provide power to the mobile device 108 before needing to be charged, or any combination of the foregoing.

In an embodiment, the request to generate one or more position records may include an override that overrides one or more previous requests made by the application.

At block 604, the low power core 220 determines one or more parameters for determining a position of the mobile device 108, one or more parameters for sampling data from the one or more sensors 224, or any combination thereof.

In an embodiment, one or more mobile apps may issue multiple requests with different requirements, and the low power core 220 may determine whether or not it is possible to service all the requirements. In an embodiment, the low power core 220 may utilize the latest request if the low power core 220 is unable to service all of the requirements in the previous requests, and/or utilize as many of the previous requirements as possible from previous requests. In some cases, the low power core 220 may utilize the request having the highest granularity. For example, one mobile app may request a position every ten seconds when the mobile device 108 is moving and a second mobile app may request a position every second when the mobile device 108 is moving. In this situation, the low power core 220 may utilize the higher frequency for generating position records and determine the position of the mobile device 108 every second.

At block 606, the low power core 220 sets the position fix rate of the mobile device 108 based on the one or more determined parameters for determining the position of the mobile device 108 and, if also requested, sets the sampling rate for the data captured/generated by the one or more sensors 224 based on the one or more parameters for sampling the data from the one or more sensors 224.

At 608, the positioning engine 322 may obtain the position of the mobile device 108 based on the position fix rate set at 606, and, if requested, may sample the data from the one or more sensors 224 based on the sampling rate set at 606, as discussed above. Alternatively, or additionally, the positioning engine 322 may obtain the position of the mobile device 108 independent of a position fix rate request. For example, the mobile device 108 may periodically determine the position of the mobile device 108 even if there are no applications requesting the position of the mobile device 108. This allows the mobile device 108 to quickly service an application's request for a position of the mobile device 108 once the request is received, and it enables contextual awareness to improve the user's experience.

The positioning engine 322 may store the times at which the position of the mobile device 108 is obtained in time fields 312a. In an embodiment, the time at which the position is obtained, such as the times in time fields 312a/b, may be stored in any of various ways such as epoch time, calendar time, etc.

The positioning engine 322 may store the obtained positions in position fields 314a. In an embodiment, the position of the mobile device 108 may be stored in position fields 314a/b as one or more geographic coordinates. In another embodiment, the position may include a geographic coordinate but also include one or more relative coordinates. For example, the mobile device 108 may be at an indoor location that has Bluetooth® beacons, but the beacon positions may not be set to the geographic coordinate system, so the mobile device 108 position may include the geographic coordinates also well one or more coordinates that are relative to the Bluetooth® beacons. In an embodiment, the mobile device 108 may also obtain data from the one or more sensors 224. For example, the mobile device 108 may obtain sensor data from a heart rate sensor. In an embodiment, the data from the one or more sensors 224 may be obtained at the same rate as the position of the mobile device 108. In an embodiment, the mobile device 108 may obtain data from the one or more sensors 224 independent of a request from an application to sample data from the one or more sensors 224.

Figure 7:
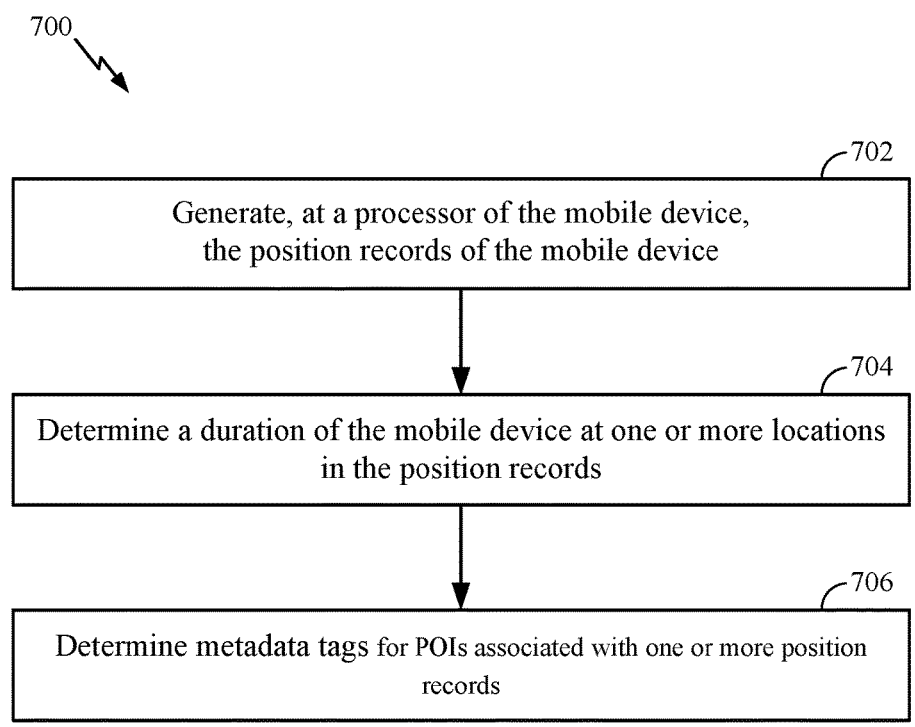
FIG. 7 is a flow diagram illustrating a method for generating a location history record of the mobile device according to at least one aspect of the disclosure.

FIG. 7 is a flow diagram illustrating a method 700 for generating a location history record of the mobile device 108 according to at least one aspect of the disclosure. In the method 700, at block 702, the mobile device 108, specifically the location compression and analytics module 324, generates position records, such as time and position fields 312b and 314b, as described above with reference to FIG. 3.

At block 704, the mobile device 108, specifically the location compression and analytics module 324, may determine a duration of the mobile device at one or more positions indicated in the position records, such as the durations in duration fields 316 in FIG. 3. The location compression and analytics module 324 of the mobile device 108 may determine the duration that the mobile device 108 has been at a particular location by taking a time difference between the first time record and the last time record that were at the same or similar position. For example, the location compression and analytics module 324 may access a series of time and position records that are at the same location, with the time difference between the first time record and the last time record in the series being one hour, then the location compression and analytics module 324 may generate a location history record for the position and the duration being one hour.

In an embodiment, the location compression and analytics module 324 may use a threshold to determine whether or not two or more positions are similar and should be clustered together, as discussed above with reference to FIG. 3. For example, the location compression and analytics module 324 may use a threshold of 10%, so that a second position must be within 10% of the first position. In another example, the location compression and analytics module 324 may use a threshold of 100 feet, so that the distance between the first position and a second position must be 100 feet or less to be considered similar positions that should be clustered.

In an embodiment, the location compression and analytics module 324 of the mobile device 108 may determine one or more points of interest corresponding to one or more time and position records. If the one or more time and position records correspond to one or more similar points of interests then the location compression and analytics module 324 may generate one or more location history records based on the one or more similar points of interest and determine a duration based on the one or more time records.

For example, there may be three time and position records that have different geographic coordinates that are close to each other but are not exactly the same, and are associated with the same point of interest, such as a Safeway™ grocery store. In that situation, the location compression and analytics module 324 may generate a location history record where the position corresponds to the Safeway™ point of interest, and the duration is the time difference between the first time record and the last time record of the three time and position records.

In another example, there may be three time and position records that have different geographic coordinates that are in close proximity, but two of the time and position records correspond to a Safeway™ grocery store and the third corresponds to a Starbucks™ coffee shop. This may occurs in numerous situations, such as where the Safeway™ store contains a Starbucks™ store/kiosk, the Safeway™ store is near a Starbucks™ store, or the user is moving from the Safeway™ store to the Starbucks™ store. In these situations, the location compression and analytics module 324 may generate at least one location history record that corresponds to the Safeway™ store, with the duration determined based on a time difference between the first record and the last record that have the Safeway™ store as a point of interest, and at least one other location history record that corresponds to the Starbucks™ store, with the duration determined based on a time difference between the first record and the last record that have the Starbucks™ store as a point of interest.

In an embodiment, the location history records may correspond to a route within the point of interest. For example, a plurality of time and position records may correspond to a Safeway™ store and the plurality of time and position records may indicate the route of the mobile device 108 through the Safeway™ store. In this situation, the location compression and analytics module 324 may collate these positions and include it as a route in the information associated with the location history record. This is beneficial because a Safeway™ application may request the route when requesting the information associated with the location history records so that Safeway™ can improve the layout of their store, provide coupons, etc.

In another embodiment, the location history record may be a sub-record of one or more other location history records. For example, a plurality of time and position records may correspond to a Safeway™ store and a main record storing information associated with the location history record may be generated to correspond to Safeway™. However, the location compression and analytics module 324 may generate additional location history records that are defined as sub location history records under the main Safeway™ record, and each sub location history record may include areas the mobile device 108 was located within the Safeway™ store. For example, there may be a sub location history record that indicates the mobile device 108 was located in the bakery section for 30 minutes, and another sub location record that indicates that the mobile device 108 was located in the produce section for five minutes. This allows for an application to receive more granularity of where the mobile device 108 was located, and allows for a more flexible approach for organizing the information associated with the location history records when more granularity is needed.

In another embodiment, the location history record may correspond to a secondary point of interest within the primary point of interest. For example, there may be a plurality of time and position records that correspond to the Bellagio™ casino. The location compression and analytics module 324 may generate a location history record for the entire duration that the mobile device 108 was located in or near the Bellagio™. However, the location compression and analytics module 324 may also generate location history records for various points of interest within the Bellagio™, such as the Fiori di Como by Dale Chihuly.

In an embodiment, the location compression and analytics module 324 generates records of information associated with the location history records for the closest points of interest. For example, the time and position records may indicate that the mobile device 108 was located near the Fiori di Como chandelier for 10 minutes, the Fountains of Bellagio™ for 30 minutes, and the Botanical Gardens at Bellagio™ for 25 minutes. However, rather than generating a single location history record corresponding to the point of interest for the Bellagio™, the location compression and analytics module 324 may generate at least three location history records: one for the Fiori di Como, another for the Fountains of Bellagio™ and the last for the Botanical Gardens at Bellagio™.

In an embodiment, the location compression and analytics module 324 may also generate one or more location history records corresponding to a point of interest that includes one or more previously generated location history records. For example, in the preceding example, the location compression and analytics module 324 may also generate a location history record for the Bellagio™.

In an embodiment, the location compression and analytics module 324 may generate one or more location history records based on the same time and position records previously used to generate one or more location history records (i.e., used to generate the Fountains of Bellagio location history record and now used to generate the Bellagio™ location history record). Specifically, there may be a threshold that indicates the limit at which to generate location history records that correspond to one or more previously generated location history records and/or to use time and position records that were previously used to generate location history records. For example, a threshold may be set to a city, so in the example above, another location history record may be generated by the location compression and analytics module 324 with the point of interest being Las Vegas. However, the location compression and analytics module 324 will not generate a location history record for the state of Nevada, because it would violate the threshold.

In an embodiment, there may be a minimum duration threshold for generating a location history record. For example, the location compression and analytics module 324 may use a threshold that requires the duration to be at least five minutes long for a location history record to be generated. Thus, if one or more points of interest only have an associated duration of four minutes, then the location compression and analytics module 324 will not generate a location history record. In another embodiment, the location compression and analytics module 324 may generate a location history record for one or more points of interest, but if the duration at the point of interest does not meet a threshold, then the location compression and analytics module 324 may delete the location history record. For example, if the threshold is fifteen minutes, the location history record 502K in FIG. 5 may be deleted because the duration in duration column 510 in the location history record 502K (five minutes) is less than fifteen minutes. Alternatively, or additionally, if a duration exceeds or meets a threshold, then the location compression and analytics module 324 may not generate a location history record and/or may delete a location history record. For example, if the threshold is one hour and a location history record has a duration of five hours, then the location compression and analytics module 324 may delete that particular location history record.

At block 706, the location compression and analytics module 324 may determine metadata tags for POIs associated with one or more position records, as discussed above with reference to FIG. 3.

As discussed above, the metadata tags may include sensor data from one or more sensors. For example, a metadata tag may also include data from a temperature sensor, if requested by a mobile app, as discussed above with reference to FIG. 6. In an embodiment, the metadata tags may contain all the sensor data that corresponds to the location record. In another embodiment, the metadata tags may include sensor data that is an average of the sensor data, a median of the sensor data, a standard deviation of the sensor data, or any combination thereof. For example, there may be three location records that correspond to a similar position and are associated with heart rate data of 55 bpm, 60 bpm, and 65 bpm from a heart rate sensor of the one or more sensors 224, and may also be associated with temperature data of 98 degrees, 98.5 degrees, and 99.5 degrees from a temperature sensor of the one or more sensors 224. The location compression and analytics module 324 may generate metadata tags that contain an average heart rate of 60 bpm and an average temperature of 98.67 degrees. In an embodiment, the location compression and analytics module 324 may generate the metadata tags, and may later, upon retrieving the sensor data, update the location history record with the data from the one or more sensors 224.

In an embodiment, as discussed above with reference to FIG. 3, the metadata tags may also include an activity associated with the corresponding POI. The location compression and analytics module 324 may determine an activity of the mobile device 108 based on user prompts, user changes, user-defined rules, preconfigured rules, operating system rules, application rules, machine learning, OEM rules, the point of interest database, payment information, or any combination thereof. For example, the location compression and analytics module 324 may prompt the user to classify an activity either when the location compression and analytics module 324 is generating a metadata tag associated with the location history record or after it has been generated. For example, after the user has left a grocery store, the user may be prompted to classify the activity, and the user may input and/or select an activity of "grocery shopping." The processor 228 may associate the point of interest with grocery shopping for future interactions through either this user-defined rule and/or machine learning.

In another example, the user may have previously defined that a mall POI is an activity classified as "shopping." However, during a given trip, the user of the mobile device 108 may have visited a gym at the mall, so the user may change the classification of the activity for this trip to "fitness," for example. The location compression and analytics module 324 may utilize machine learning to better classify activities.

In another example, a metadata tag associated with a location history record may be generated for a recent trip to Whole Foods™, but rather than prompt the user of the mobile device 108, the location compression and analytics module 324 may access a point of interest database that may include a classification of the point of interest, which in this case, would be a grocery store. In that case, the location compression and analytics module 324 may utilize this information to classify the activity as "grocery shopping," for example.

In yet another example, the user of mobile device 108 may visit a grocery store that is located in a mall, but the positioning engine 322 may not be able to determine an accurate position to identify exactly where in the mall the mobile device 108 is located. The location compression and analytics module 324 may generate a metadata tag associated with a location history record for the mall and classify it as "shopping." However, if the user provides payment information through an application on mobile device 108, or can retrieve a recent transaction through an application (e.g., the user paid with a physical credit card but the application for the credit card can quickly retrieve the recent transaction) then the location compression and analytics module 324 may utilize this information to determine that the transaction occurred at a grocery store, use the information to get the point of interest, and classify the activity as grocery shopping.

In an embodiment, the location records may be deleted after a location history record has been generated, after the location compression and analytics module 324 determines that a location history record cannot be generated based on the position record, or any combination thereof. For example, the location compression and analytics module 324 may determine that two location records are not at the same point of interest and may instead indicate that the user of mobile device 108 is driving or that the position maps to a road rather than a point of interest. In that situation, the location compression and analytics module 324 may delete these records.

Referring to the position ID column 518 in FIG. 5, in an aspect, a location history record can be deleted in response to a lack of an identification of the position in the column 518. For example, the location history record 502L could be deleted in response to the lack of an identification of the position in the position ID column 518 of the location history record 502L.

Figure 8:
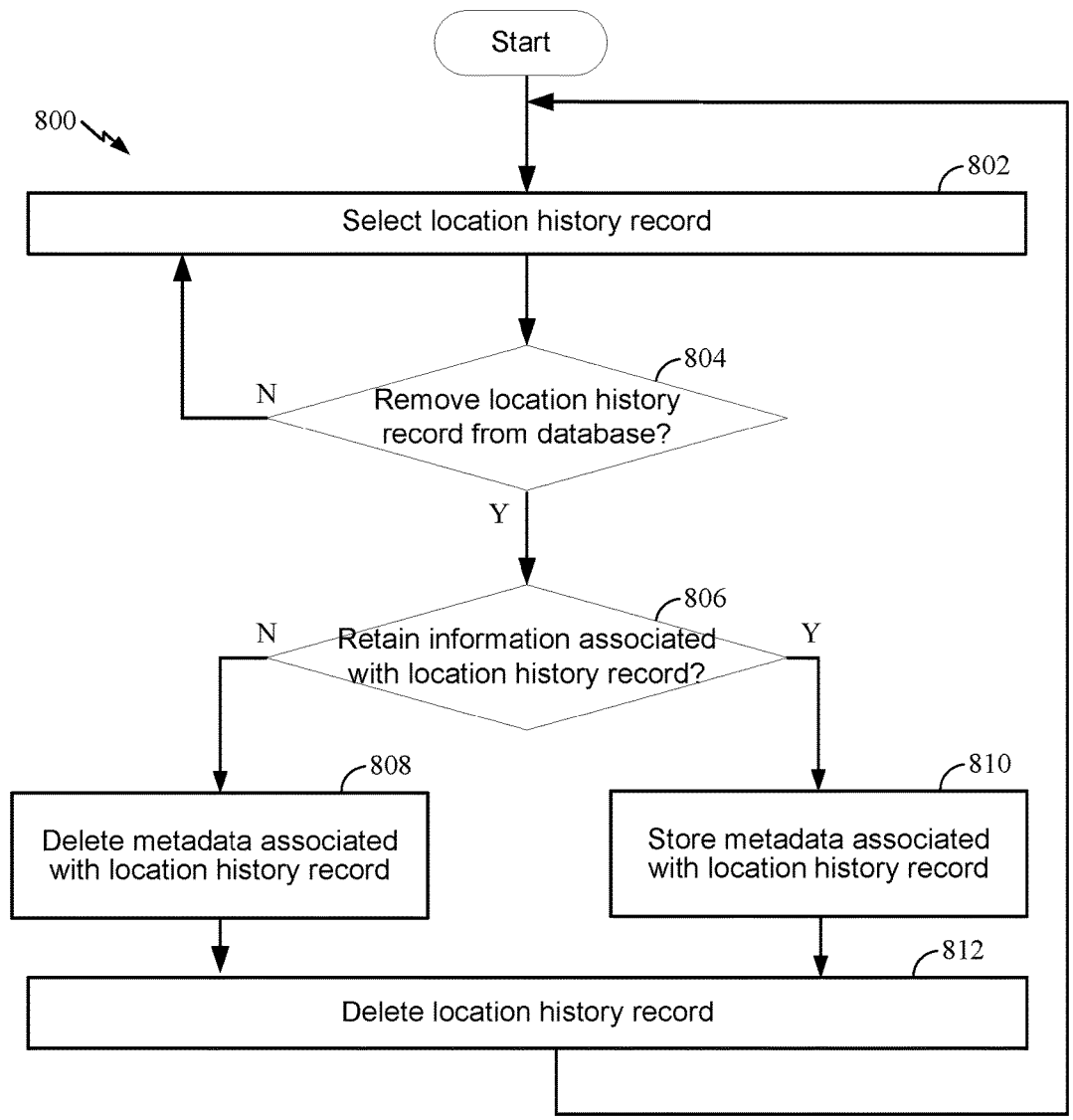
FIG. 8 is a flow diagram illustrating a method for maintaining the database of location history records according to at least one aspect of the disclosure.

The processor 228 may also perform various functions for maintaining the location history database. FIG. 8 is a flow diagram illustrating a method 800 for maintaining the database of location history records according to at least one aspect of the disclosure. At 802, the processor 228 selects a location history record. At 804, the processor 228 determines whether or not to remove the location history record from the database.

In an embodiment, the processor 228 may remove a location history record that exceeds a time threshold. For example, if the time threshold is two months, the processor 228 may delete location history records that are older than two months, such as location history record 502Z in FIG. 5. In this manner, location history records that have times that are too old to be of value to the user and/or applications.

In another embodiment, the processor 228 may generate a computation related to the one or more location history records. By way of example, and not by way of limitation, the computation may include a count of the number of location history records, an average of the time duration 510 of the one or more locations, metadata, other statistics (e.g., mean, standard deviation, etc.) about the one or more location history records, or any combination of the foregoing. For example, the processor 228 may generate statistics for each points of interest (e.g., Whole Foods®), such as the number of location history records with the associated point of interest being Whole Foods® in the last two months, the average duration at the Whole Foods® for that time period, the maximum duration, the minimum duration, the number of different Whole Foods® stores visited, the locations of each Whole Foods® visited, etc. In an embodiment, this information may also be generated for specific locations within a point of interest (e.g., the average duration in the bakery at Whole Foods®, the average duration at the checkout at Whole Foods®, etc.). This information may be stored with the location history records and/or in a separate database.

In an embodiment, the processor 228 may determine the time period based on previous application requests. For example, the processor 228 may determine that an application only requested a one month time period for the last five requests. In another example, the processor 228 may utilize the last time an application made a request as the start time of the time period and the end time of the time period as the current date.

Based on these various calculations, the processor 228 determines whether or not to remove the location history record from the database at 804. If the processor 228 determines to remove the location history record at 804, then at 806, the processor 228 determines whether or not to retain any information associated with the location history record being deleted, such as the associated metadata tags. This may include considerations similar to the considerations regarding whether or not to delete the location history record, such as age of the information, level of detail of the information (a record with less detail may indicate a lack of importance), lack of detail (a record with very little information may indicate a lack of importance), duration, and the like.

If the processor 228 determines to delete the information associated with the location history record, then at 808, the processor 228 deletes the information. If, however, the processor 228 determines to retain the information associated with the location history record, then at 810, the processor 228 stores the information in, for example, the memory 210. Either way, at 812, the processor 228 deletes the location history record. The flow then returns to 802 where the processor selects the next location history record to analyze.

In an embodiment, the processor 228 may determine various statistics for location history records that have the same activity. For example, the processor 228 may identify location history records with the Shopping activity illustrated in FIG. 4, subsets of the Shopping activity (e.g., the Safeway™ location, the Trader Joe's location, and the Whole Foods® location), and two intermediate subsets (e.g., the Grocery Shopping intermediate subset and the Apparel Shopping). The processor 228 may further determine the average time duration of those location history records, the average time of day, etc.

In an example, if a given application, such as the Yelp application, has received information that a user of the mobile device 108 has written reviews for the restaurants Chez LaVerne, Chez Maxine, and Chez Patricia, the application may desire the computations related to the location history records related to the activity of Dining to assess the legitimacy of the reviews. If the computations related to the location history records are provided to the application, the application can determine that the mobile device 108 (and, by extension, a user of the mobile device 108) has a recent location history of having been at Chez LaVerne eight different times in the past two months with an average time duration of thirty minutes per visit. The application may determine that the review of Chez LaVerne has a high degree of legitimacy and/or worthiness, and the application may utilize this information to adjust the weight of the user's review, etc.

If, however, the computations related to the location history records are provided to the application, the application may determine that the mobile device 108 (and, by extension, a user of the mobile device 108) has no recent location history of having been at Chez Maxine. The application may therefore determine that the review of Chez Maxine has a low degree of legitimacy. If the computations related to the location history records are provided to the application, the application may determine that the mobile device 108 (and, by extension, a user of the mobile device 108) has a recent location history of having been at Chez Patricia eighty five different times in the past two months with an average time duration of four hours per visit. The application may determine that the review of Chez Patricia has a low degree of legitimacy because the location history suggests that the user of the mobile device 108 is an employee of Chez Patricia.

The present disclosure provides a permission model for an application to access the location history records. Current permissions on operating systems such as Android are not adequate for exposing location history. Currently, only ACCESS_COARSE_LOCATION and ACCESS_FINE_LOCATION are supported.

The present disclosure provides additional permissions to allows mobile apps to retrieve location history records and/or a subset of the information in the location history records. For example, a permission of ACCESS_COARSE_LOCHISTORY may allow a mobile app to access all location history records. A permission of ACCESS_FINE_LOCHISTORY may also allow a mobile app to access all location history records, but at a greater level of detail. A permission of ACCESS_CATEGORY_LOCHISTORY may allow a mobile app to access location history records for specific categories of locations. This permission can be extended per category, such as shopping, fitness, dining, etc. Additionally, this accessibility may be changed in response to a mobile app offering the user of mobile device 108 a coupon or other promotion. As will be appreciated, other permissions may be available to a mobile app.

Different mobile apps may have different needs from the location history information. For example, a restaurant review application may need certain information for verifying/upvoting reviews written after a few days of a visit to a restaurant, whereas a fitness application may need different information to count visits to the gym or park. A department store application may need yet other information to count the dwell time at the department store or other retailers to tailor offers to the user of mobile device 108.

Accordingly, the present disclosure is able to expose different levels of detail and granularity of the location history records based on the needs of the mobile app and/or the user of mobile device 108. A mobile app can access the location history records using an API that specifies the type and level of access requested. This logic is implemented in the location history extraction/abstraction module 326 in FIG. 3, represented as "LocationHistoryAPI( )" Information that can be requested using the API include the time period of the information to retrieve, the category of the information, location history information related to a specific activity, a determination of what information is accessible to the mobile app, computations on the properties of the location history records (e.g., visits and dwell times) such as sum, median, average etc. Additionally, the mobile app could pass geofence parameters to the location history extraction/abstraction module 326 via the API, and the location history extraction/abstraction module 326 can use the geofence parameters when performing computations on the properties of the location history records.

Example calls to the LocationHistoryAPI( ) may include:
getLocHistoryVisits(time, category)
getLocHistoryVisits(time, geofence)
getLocHistoryDwellTimes(time, category)
getLocHistoryDwellTimes(time, activity)

In an embodiment, a request from a mobile app may include a point of interest, an activity associated with a position in the location history records, a category of the activity, a category of the application making the request, a category of the point of interest, the application's credentials to access the location history records, a position uncertainty threshold associated with a determination of the position, a technology used to determine the position, a time period of the location history records to search, a time the location history records were generated, a use of the location history record by the application, a name of the application, a specification of data produced by a sensor of the mobile device 108, or any combination thereof.

In an embodiment, the location history extraction/abstraction module 326 may determine whether the mobile app has permission to access the requested information by comparing information in the request to a user prompt, preset permissions, preset rules, previously granted permissions, or any combination thereof.

In an embodiment, the location history extraction/abstraction module 326 may determine whether the mobile app has permission to access the requested information by utilizing a user prompt. For example, during the installation of the mobile app, the user may be prompted to answer whether or not the application may access the user's location history records and if there are any limits to what the application may access from the user's location history records. The user prompt may also be displayed when the application is requesting the location history records to determine whether or not the application still has permission to access the location history records of the mobile device 108.

In another embodiment, the user prompt may include additional information, such as coupons, rewards, etc. The application request may contain an inducement that can be displayed in the user prompt that can be used to further entice the user to allow the application to access the mobile device 108's location history. For example, a Starbucks™ application may request any location history records associated with a Starbuck™ store, and the application request may include an inducement that allows the user of mobile device 108 to receive a free coffee drink at Starbucks™ in exchange for the user allowing the Starbuck™ application access to the mobile device 108's location history records.

In another example, a carrier, manufacturer, operating system developer, etc. may set permissions on the mobile device 108 that indicate which applications may access the location history records and the extent to which the application may access the location history records.

In an embodiment, the user of mobile device 108 may set rules that indicate which applications may access the location history records. For example, the user may set a rule that allows all coupon applications to access the number of times the mobile device 108 has been at a grocery store within the last week. In that situation, if the coupon application requests location history information for the number of times the user has been to department stores instead, then the request may be denied or the user may be prompted.

In another example, the user may allow shopping applications to access location history information associated with the corresponding store locations. Thus, when the user installs a new shopping application, the location history extraction/abstraction module 326, through machine learning, may access the user's permission pattern and set this permission as the default for the new shopping application.

In another example, the user may have always previously allowed an application to access the mobile device 108's location history records, so the location history extraction/abstraction module 326 may grant the application access to the mobile device 108's location history records for this particular request without having to prompt the user.

In an embodiment, the location history extraction/abstraction module 326 may prompt the user when the requesting application requests the location history information, and the location history extraction/abstraction module 326 may determine whether the application may access the location history records based on the user's response to the prompt. For example, when the application requests location history information, a prompt may be displayed for the user to answer whether the application can access the location history information, and the prompt may display the extent of the request.

Figure 9:
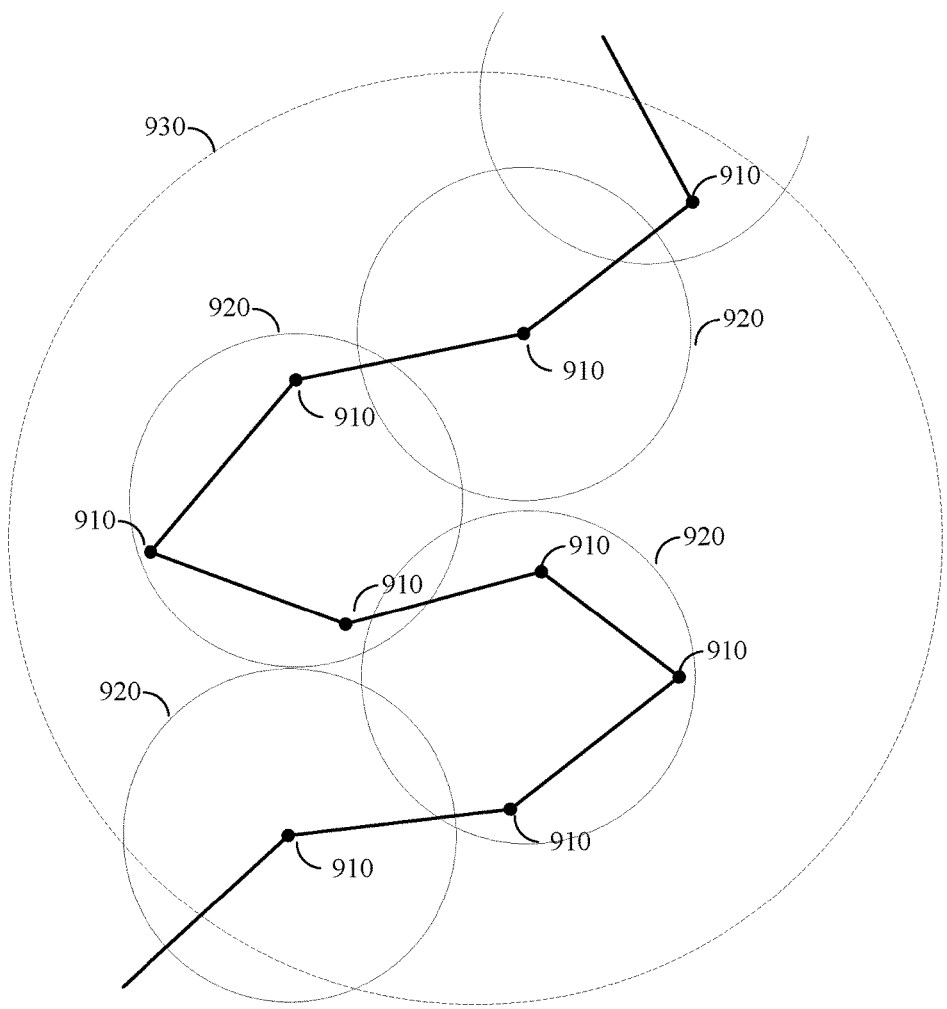
FIG. 9 illustrates exemplary levels of granularity of position information that may be tracked by the mobile device according to at least one aspect of the disclosure.

Additionally, the application request may include information to allow the user of mobile device 108 to properly control the privacy of the mobile device 108's location history. For example, with reference to FIG. 9, the location history information may contain detailed information about the mobile device 108's route, represented as a series of points 910, and detailed heart rate sensor information associated with the route. The series of points 910 may represent the positions of the mobile device 108 at periodic GPS fixes. The location history records may also contain a higher-level view of the route of the mobile device 108, where the position of the mobile device 108 may correspond to coverage areas 920 of a plurality of access points (e.g., WLAN access points, Bluetooth® access points, etc.) that the mobile device 108 came within range of and may have accessed. Finally, the location history records may contain a high-level view of the location of the mobile device 108, where the position of the mobile device 108 may correspond to a coverage area 930 of a cellular base station serving the mobile device 108.

In the case of a pedometer application, the user of mobile device 108 may permit the application to access the mobile device 108's detailed route (i.e., the series of points 910), but not to access the heart rate sensor information associated with the route. In the case of a weight loss application, however, the user may permit the application to access the heart sensor rate information associated with the mobile device 108's route. However, rather than providing access to the mobile device 108's route, the user may limit the weight loss application's permission to only receive access to the high-level area 930 of where the heart rate sensor information was recorded.

In an embodiment, the information in the request for the location history information may be used to filter the location history records. For example, the request for location history information may include a category or sub-category, such as grocery shopping. The location history extraction/abstraction module 326 may determine whether the requesting application may access location history records associated with grocery shopping, and if so, can filter the location history records to only include location history records that have points of interest associated with "grocery shopping."

Referring to FIG. 5, for example, the location history records 502A-Z would be filtered to include location history records from Safeway™, which include location history records 502D, 502E, and 502I, and location history records from Whole Foods™, which include location history record 502F. However, it would not include a location history record, such as 502M, associated with 7-Eleven™, because it was not classified as "grocery shopping."

In an embodiment, the request may include an indication of a granularity level of the location history records, referred to herein as location granularity. For example, an application may want to know where the user was in a particular store, the duration a user spent at particular locations within a store, the user's route within the store, etc., whereas, a different application may only want to know how many times the user was at the store. The location history records may include varying degrees of location granularity based on different application needs, user permissions, technologies available to determine position, etc. For example, an application associated with a grocery store may wish to know the precise locations of users (e.g., the series of points 910 in FIG. 9) to aid in route planning within the store, placement of advertisements, etc., whereas a coupon application may need the number of times the user has been to a particular store to provide the user with reward coupons. In another example, the user may permit one application access to high precision location data (e.g., the series of points 910 in FIG. 9), whereas, another application is only permitted to access low precision location data (e.g., coverage areas 920 or 930 in FIG. 9).

In an embodiment, the request may include credentials for the application, such as a key. The location history extraction/abstraction module 326 may utilize the credentials to determine whether the application is permitted to access the location history records. For example, the location history extraction/abstraction module 326 may compare the key from the request to a key associated with the location history records to determine whether the application is permitted to access the location history information. The key can be stored as a field of at least one of the location history records 502A-502Z or in a different portion of the memory 210.

The key may be stored and associated with a category of a point of interest, category of activity, category of the application, one or more points of interest, one or more activities, a position uncertainty threshold associated with a determination of the position of the mobile device 108, a technology used to determine the position of the mobile device 108, a time period of the location history record, a time the location history record was generated, a use of the location history record by the application, a name of the application, data produced by a sensor of the mobile device, or any combination thereof.

In an embodiment, the request to access the location history record may include a position uncertainty and/or position technology. For example, the location history record 502E in FIG. 5 may include a position in position column 506 obtained only from the cellular network 101 and the location history record 502D may include a position in position column 506 obtained from the cellular network 101 and another source, such as WiFi. Thus, if the request limits the position technology to WiFi and the mobile app has permission to access the location history record, then the returned information is limited to the location history record 502D. In another example, where location history record 502E has a position uncertainty of 1 kilometer and location history record 502D has a position uncertainty of 50 meters, and where the request includes a position uncertainty greater than 500 meters, then the application may access location history record 502E. If, however, the request includes a position uncertainty less than 500 meters, then the application may access location history record 502D.

In an embodiment, the request may include a time period, wherein the location history records are limited to records that are within the time period. The time period may specify when the location history record was created, when the position was determined, etc. For example, with reference to FIG. 5, if the request includes a time period that is from 14 Jul. 2014 12:00 pm to 14 Jul. 2014 3:00 pm (and the processor 228 had determined that the application has permission to access the location history record), then location history record 502I, which is within the time period from 14 Jul. 2014 12:00 pm to 14 Jul. 2014 12:30 pm, is provided to the application.

In another example, the user may enable a privacy mode that blocks one or more applications from accessing location history records from the time period that the privacy mode is enabled. The user of the mobile device 108 may wish to limit sharing of the mobile device 108's location history records to one application, but may only want to do so temporarily without changing permission settings. Thus, the user may enable the privacy mode and enable that application to continue to access the mobile device 108's location history records. In that situation, even after the user has disabled the privacy mode, other applications may not be permitted to access the location history records generated within the time period that the device was in the privacy mode.

In an embodiment, the request may include how the location history information will be used. For example, the user may set a rule that any application that provides rewards based on the mobile device 108's location history may be permitted to access to the mobile device 108's location history records. In that situation, if an application request indicates that the application is utilizing the location history for sending a promotional offering to the user of the mobile device 108, then the location history extraction/abstraction module 326 may permit the application to access the location history records, and may also filter the location history records based on the use of the location history records.

In another embodiment, the user of the mobile device 108 may allow applications to access the location history records based on the application's use of the location history records. In that situation, the location history extraction/abstraction module 326 compares the use of the location history records in the request to the use of the location history records permitted by the user, and then determines whether the application may access the location history records based on the comparison.

In an embodiment, the request may include the name of the application. For example, with reference to FIG. 5, if the request includes Whole Foods® as the name of the application, then the location history extraction/abstraction module 326 may determine whether the application may access the location history records associated with the Whole Foods® record 502F.

In an embodiment, the application may request location history records that contain data produced by particular sensors of the one or more sensors 224 of the mobile device 108. For example, with reference to FIG. 5, the application may request location history records that includes data from a heart rate sensor, such as location history record 502G, which includes in the field 516 information produced by the heart rate sensor (i.e., 75 bpm). The user may allow a particular application to access sensor data such as fitness applications, but may want to control which other applications may access this sensitive data.

In other cases, the user may be enticed to share location history information with the application. For example, an application may be tied to a horror movie and may give the user a free ticket to the horror movie in exchange for monitoring the user's heart rate when the user is at the movie theater. In another example, an application may be tied to a drug trial and the user may want to share information with the application as part of the drug trial (e.g., remote patient monitoring). In this case, providing the pharmaceutical company with various sensor information throughout the user's day may allow for a better understanding of the side effects of the drug, etc.

In an embodiment, the application request may include what information the application wants to be derived from the location history records. For example, with reference to FIG. 5, the data derived from the location history record 502D may include that the position in position column 506 was obtained from the cellular network 101 and another source, and that the time of a most recent request from an application for the location history record 502D was 14 Jul. 2014 6:10 pm. For example, the application may request the number of times the user has been to Safeway™ within the last thirty days, and the user may permit this application to access derived information. After the location history extraction/abstraction module 326 has determined that the application is permitted to access data derived from the location history records, the location history extraction/abstraction module 326 may determine the information derived from the location history records.

In this aspect, the data derived from the location history records can include a number of times the mobile device 108 has been at a given location and/or a number of times the mobile device 108 has been associated with a given activity. For example, the Safeway™ application may request a count of the number of location history records for Safeway™, an average of the time duration 510 of all of the location history records for Safeway™, other statistics (e.g., mean, standard deviation, etc.) about the location history records for Safeway™, and the like, or any combination of the foregoing.

In an embodiment, an application may be able to modify information in the location history records. For example, an application associated with Whole Foods® may determine that the user was at a particular Whole Foods® at a particular time and the application may have knowledge that the user only purchased food from the café at Whole Foods®. Thus, the application may retrieve the corresponding location history record, if it has permission, and reclassify it from "grocery shopping" to "dining," while still keeping the other location history records classified as grocery shopping. This allows the application to utilize information it may have about the user and update the location history records so that it is properly classified.

In an embodiment, the location history information provided to the application may include data derived from the location history records, and may also include a summary description and/or a computation based on the location history records. For example, the summary description can include an identifier of the location history record (which may be an additional field of each location history record 502A-Z in FIG. 5) and/or a narrative that describes the location history record. For example, for the location history record 502D in FIG. 5, the narrative may be "Grocery shopping at Safeway™ on Jul. 14, 2014.".

In an embodiment, the activity metadata tag associated with a location history record may be updated in response to the data produced by the one or more sensors 224. For example, an activity may be set to shopping, because the point of interest is identified as a mall. However, the sensor data from a heart rate sensor may indicate a high heart rate that may be associated with running or exercising, so the activity tag may be updated to "exercising." In the same scenario, additional sensor data from an accelerometer and a gyroscope may indicate that the cadence from the mobile device 108 and acceleration pace indicates that the user is running, so the activity of the location history record may be sub-classified as "running." In another example, with reference to FIG. 5, if one of the one or more sensors 224 is a heart rate sensor and the data produced by the heart rate sensor indicates that the user of the mobile device 108 has a heart rate that is higher than a resting heart rate, then the walking activity may be updated to a running activity.

In an embodiment, the mobile device 108 can dynamically adjust the location history tracking and caching based on the requests received from the mobile apps. Application requests can be used to perform improved location history tracking in several ways. For example, if the applications are making requests that are known to the mobile device 108 in advance, the analysis module can perform finer grained tracking of dwell times in regions where application requests have been made, use alternate positioning technologies if needed for requested categories, log additional sensors based on application requests (e.g., payment systems, music player, video player, pedometer, etc.), remove clusters from the cached location history when no current application requests match them, and the like. In addition, previous application requests can be used as a predictor for which categories the user may download mobile apps in the future. This can also be used to decide what location history information is important to the user.

Figure 10:
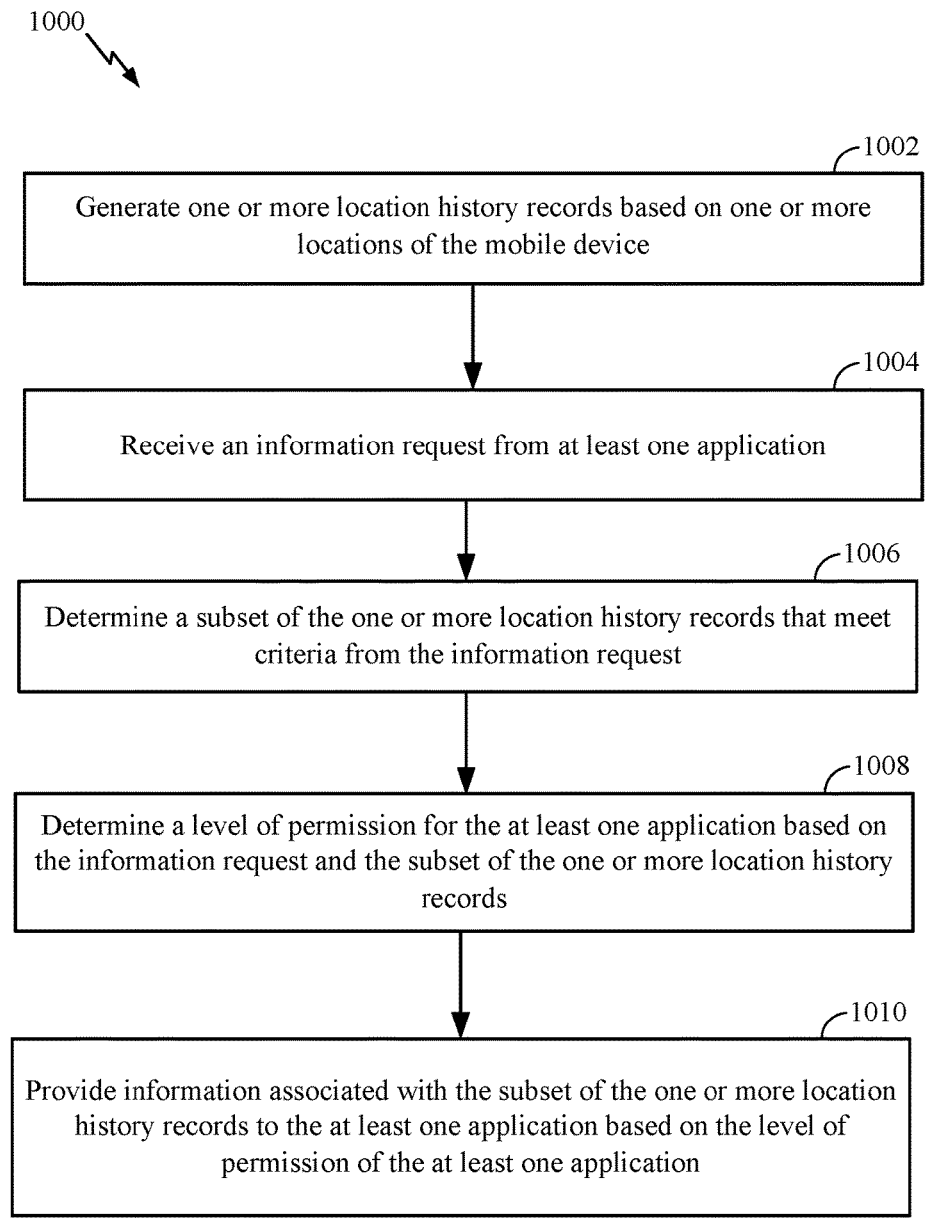
FIG. 10 is a flow diagram illustrating a method for providing information associated with a location history of a mobile device to one or more applications according to at least one aspect of the disclosure.

FIG. 10 is a flow diagram illustrating a method 1000 for providing information associated with a location history of a mobile device to one or more applications according to at least one aspect of the disclosure. At 1002, the processor 228 of the mobile device 108, for example, the location compression and analytics module 324, may generate one or more location history records based on one or more locations of the mobile device, as described above with reference to FIG. 7. The one or more locations of the mobile device may be determined at a first periodic rate, and each location history record may include one or more points of interest and a duration of the mobile device at the one or more points of interest.

At 1004, the processor 228 of the mobile device 108, for example, the location history extraction/abstraction module 326, receives an information request from at least one application of the one or more applications.

At 1006, the processor 228 of the mobile device 108, for example, the location history extraction/abstraction module 326, determines a subset of the one or more location history records that meet criteria from the information request.

At 1008, the processor 228 of the mobile device 108, for example, the location history extraction/abstraction module 326, determines a level of permission for the at least one application based on the information request and the subset of the one or more location history records.

At 1012, the processor 228 of the mobile device 108, for example, the location history extraction/abstraction module 326, provides information associated with the subset of the one or more location history records to the at least one application based on the level of permission of the at least one application. The information may be all or a subset of the various fields of the subset of the location history records and/or information derived from the subset of the location history records, as described above.

Figure 11:
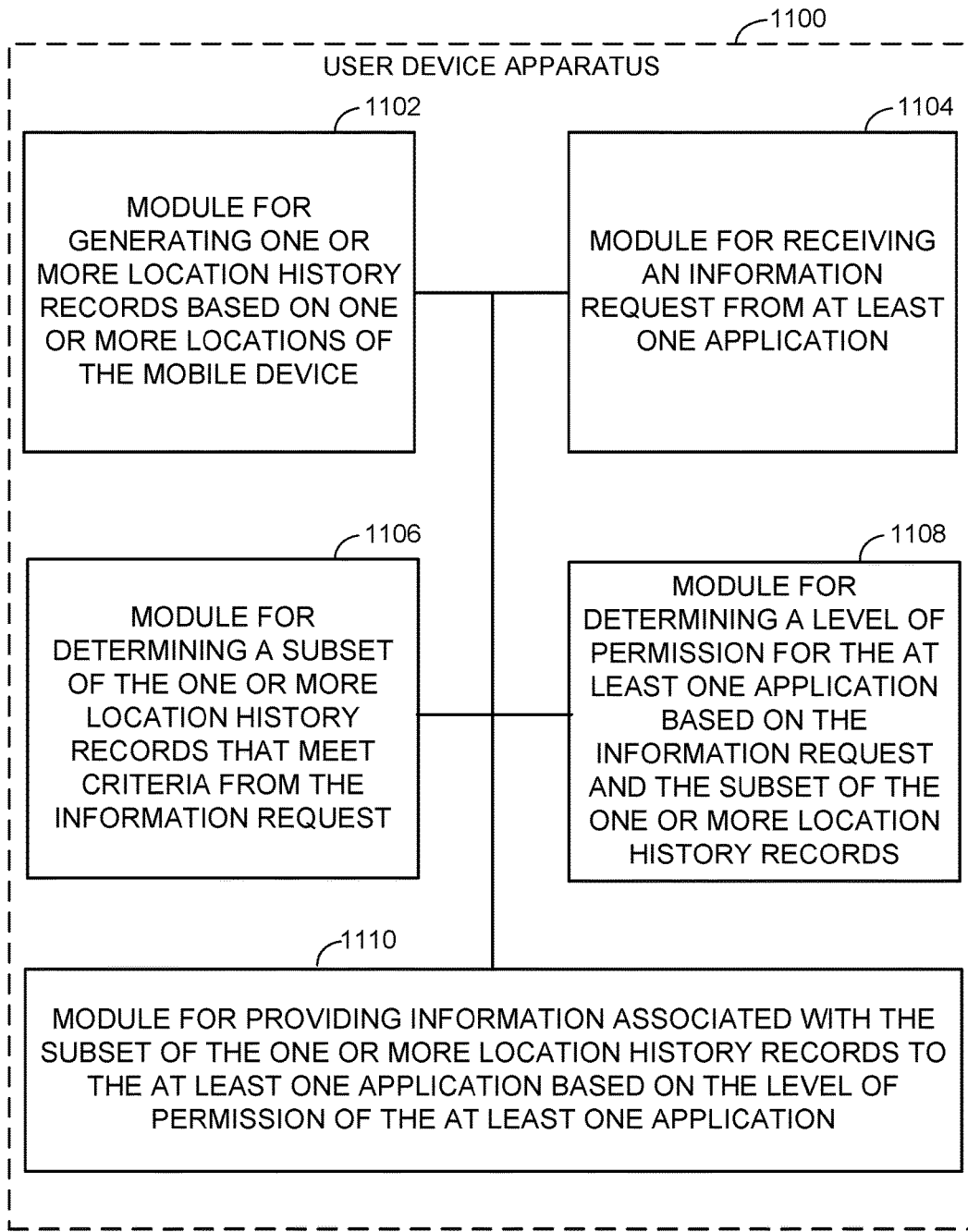
FIG. 11 is a simplified block diagram of several sample aspects of an apparatus configured to support communication as taught herein.

FIG. 11 illustrates an example user device apparatus 1100 represented as a series of interrelated functional modules. A module for generating 1102 may correspond at least in some aspects to, for example, a processing system, such as processor 228 in FIG. 2, as discussed herein. A module for receiving 1104 may correspond at least in some aspects to, for example, processing system, such as processor 228 in FIG. 2, as discussed herein. A module for determining 1106 may correspond at least in some aspects to, for example, processing system, such as processor 228 in FIG. 2, as discussed herein. A module for determining 1108 may correspond at least in some aspects to, for example, a processing system, such as processor 228 in FIG. 2, as discussed herein. A module for providing 1110 may correspond at least in some aspects to, for example, a processing system, such as processor 228 in FIG. 2, as discussed herein.

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein.

Those of skill in the art understand that features described herein with reference to one figure can be interchangeable with features described herein with reference to other figures and that lack of a description of specific feature with reference to a particular figure does not preclude that specific feature from being incorporated into the example of the aspect illustrated by the particular figure.

Those of skill in the art appreciate that information and signals can be represented using any of a variety of different technologies and techniques. For example, data, instructions, commands, information, signals, bits, symbols, and chips that may be referenced throughout the above description can be represented by voltages, currents, electromagnetic waves, magnetic fields or particles, optical fields or particles, or any combination thereof.

Further, those of skill in the art appreciate that the various illustrative logical blocks, modules, circuits, and algorithm operations described in connection with the aspects disclosed herein can be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the aspects disclosed herein.

The various illustrative logical blocks, modules, and circuits described in connection with the implementations disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be realized directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, a hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for producing a location history record of a mobile device 108. Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, operations and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of providing information associated with a location history of a mobile device to one or more applications, comprising:
generating, by at least one processor of the mobile device, a plurality of location history records corresponding to a plurality of locations of the mobile device, wherein each location history record of the plurality of location history records comprises a location of the mobile device and a time at which the mobile device was at the location;

storing, in a local memory of the mobile device, the plurality of location history records;

receiving, at the processor of the mobile device, subsequent to storing the plurality of location history records, a first information request from a first application of the one or more applications, the first information request including a first set of criteria for filtering the plurality of location history records;

determining, by the at least one processor of the mobile device, a first subset of the plurality of location history records that meet the first set of criteria; and providing, by the at least processor of the mobile device, information associated with the first subset of the plurality of location history records to the first application based on a first level of permission of the first application and the first set of criteria.

2. The method of claim 1, wherein each location history record of the plurality of location history records further comprises a duration of the mobile device at the location.

3. The method of claim 1, wherein each location history record of the plurality of location history records further comprises an activity of a user of the mobile device at the location or an identification of the location.

4. The method of claim 3, wherein the identification of the location is associated with at least one of a point of interest in a point of interest database, a location defined by a geofence, or any combination thereof.

5. The method of claim 1, further comprising:
determining, by the at least one processor of the mobile device, a first level of permission of a plurality of levels of permission for the first application based on the first information request and the first subset of the plurality of location history records, wherein a higher level of permission of the plurality of levels of permission permits access to a finer level of granularity of the plurality of location history records.

6. The method of claim 1, wherein the first set of criteria further comprises at least one of an activity associated with a location in the first subset of the plurality of location history records, a category of the activity, a category of the first application, a category of a point of interest, a level of access for which the first application has authorization, a security key configured to provide access to the first subset of the plurality of location history records, a position uncertainty threshold associated with a determination of the location, a technology used to determine the location, a time period of the first subset of the plurality of location history records, a time of a production of the first subset of the plurality of location history records, a use of the first subset of the plurality of location history records by the first application, a name of the first application, data produced by a sensor of the mobile device, data derived from the first subset of the plurality of location history records, or any combination thereof.

7. The method of claim 1, wherein the information associated with the first subset of the plurality of location history records comprises at least one of a technology used to determine a location of the plurality of location history records, a time of a most recent request for the information associated with the first subset of the plurality of location history records, a frequency of requests for the information associated with the first subset of the plurality of location history records, an identification of the location, an activity associated with the location, data produced by a sensor of the mobile device, an analysis of the data produced by the sensor, a number of times the mobile device has been at the location, a number of times the mobile device has been associated with the activity, or any combination thereof.

8. The method of claim 1, further comprising:
receiving, at the at least one processor of the mobile device, subsequent to storing the plurality of location history records, a second information request from a second application of the one or more applications, the second information request including a second set of criteria for filtering the plurality of location history records;

determining, by the at least one processor of the mobile device, a second subset of the plurality of location history records that meets the second set of criteria; and providing, by the at least one processor of the mobile device, information associated with the second subset of the plurality of location history records to the second application based on a level of permission of the second application and the second set of criteria.

9. The method of claim 8, wherein the first set of criteria comprises a first time period for the first subset of the plurality of location history records, and wherein the second set of criteria comprises a second time period for the second subset of the plurality of location history records.

10. The method of claim 9, wherein the first application determines whether the mobile device was located at a first location of the first subset of the plurality of location history records during the first time period, and wherein the second application determines whether the mobile device was located at a second location of the second subset of the plurality of location history records during the second time period.

11. The method of claim 10, wherein the first time period is different from the second time period.

12. The method of claim 10, wherein the first location is different from the second location.

13. The method of claim 8, wherein the level of permission of the first application is higher than the level of permission of the second application.

14. The method of claim 13, wherein based on the level of permission of the first application being higher than the level of permission of the second application, the information associated with the first subset of the plurality of location history records provided to the first application comprises more information than the information associated with the second subset of the plurality of location history records provided to the second application.

15. The method of claim 14, wherein the information associated with the first subset of the plurality of location history records comprises all information associated with the first subset of the plurality of location history records.

16. The method of claim 14, wherein the information associated with the second subset of the plurality of location history records comprises less than all information associated with the second subset of the plurality of location history records.

17. An apparatus for providing information associated with a location history of a mobile device to one or more applications, comprising:
at least one processor of the mobile device configured to:
generate a plurality of location history records corresponding to a plurality of locations of the mobile device, wherein each location history record of the plurality of location history records comprises a location of the mobile device and a time at which the mobile device was at the location;

store, in a local memory of the mobile device, the plurality of location history records;

receive, subsequent to the plurality of location history records being stored in the local memory of the mobile device, a first information request from a first application of the one or more applications, the first information request including a first set of criteria for filtering the plurality of location history records;

determine a first subset of the plurality of location history records that meet the first set of criteria; and provide information associated with the first subset of the plurality of location history records to the first application based on a first level of permission of the first application and the first set of criteria.

18. The apparatus of claim 17, wherein each location history record of the plurality of location history records further comprises a duration of the mobile device at the location.

19. The apparatus of claim 17, wherein each location history record of the plurality of location history records further comprises an activity of a user of the mobile device at the location or an identification of the location.

20. The apparatus of claim 17, wherein the at least one processor is further configured to:

determine a first level of permission of a plurality of levels of permission for the first application based on the first information request and the first subset of the plurality of location history records, wherein a higher level of permission of the plurality of levels of permission permits access to a finer level of granularity of the plurality of location history records.

21. The apparatus of claim 17, wherein the at least one processor is further configured to:

receive, subsequent to the plurality of location history records being stored in the local memory of the mobile device, a second information request from a second application of the one or more applications, the second information request including a second set of criteria for filtering the plurality of location history records;

determine a second subset of the plurality of location history records that meets the second set of criteria; and provide information associated with the second subset of the plurality of location history records to the second application based on a level of permission of the second application and the second set of criteria.

22. The apparatus of claim 21, wherein the first set of criteria comprises a first time period for the first subset of the plurality of location history records, and wherein the second set of criteria comprises a second time period for the second subset of the plurality of location history records.

23. The apparatus of claim 22, wherein the first application determines whether the mobile device was located at a first location of the first subset of the plurality of location history records during the first time period, and wherein the second application determines whether the mobile device was located at a second location of the second subset of the plurality of location history records during the second time period.

24. The apparatus of claim 23, wherein the first time period is different from the second time period.

25. The apparatus of claim 23, wherein the first location is different from the second location.

26. The apparatus of claim 21, wherein the level of permission of the first application is higher than the level of permission of the second application.

27. The apparatus of claim 26, wherein based on the level of permission of the first application being higher than the level of permission of the second application, the information associated with the first subset of the plurality of location history records provided to the first application comprises more information than the information associated with the second subset of the plurality of location history records provided to the second application.

28. The apparatus of claim 27, wherein the information associated with the first subset of the plurality of location history records comprises all information associated with the first subset of the plurality of location history records, and wherein the information associated with the second subset of the plurality of location history records comprises less than all information associated with the second subset of the plurality of location history records.

29. A non-transitory computer-readable medium storing computer-executable instructions for providing information associated with a location history of a mobile device to one or more applications, the computer-executable instructions comprising:

at least one instruction instructing the mobile device to generate a plurality of location history records corresponding to a plurality of locations of the mobile device, wherein each location history record of the plurality of location history records comprises a location of the mobile device and a time at which the mobile device was at the location;

at least one instruction instructing the mobile device to store, in a local memory of the mobile device, the plurality of location history records;

at least one instruction instructing the mobile device to receive, subsequent to storing the plurality of location history records, a first information request from a first application of the one or more applications, the first information request including a first set of criteria for filtering the plurality of location history records;

at least one instruction instructing the mobile device to determine a first subset of the plurality of location history records that meet the first set of criteria; and at least one instruction instructing the mobile device to provide information associated with the first subset of the plurality of location history records to the first application based on a first level of permission of the first application and the first set of criteria.

30. An apparatus for providing information associated with a location history of a mobile device to one or more applications, comprising:

a means for processing of the mobile device configured to:

generate a plurality of location history records corresponding to a plurality of locations of the mobile device, wherein each location history record of the plurality of location history records comprises a location of the mobile device and a time at which the mobile device was at the location;

store, in a local memory of the mobile device, the plurality of location history records;

receive, subsequent to the plurality of location history records being stored in the local memory of the mobile device, a first information request from a first application of the one or more applications, the first information request including a first set of criteria for filtering the plurality of location history records;

determine a first subset of the plurality of location history records that meet the first set of criteria; and provide information associated with the first subset of the plurality of location history records to the first application based on a first level of permission of the first application and the first set of criteria.

* * * * *